United States Patent
Slobodyanyuk et al.

(10) Patent No.: US 11,740,327 B2
(45) Date of Patent: Aug. 29, 2023

(54) HIGH RESOLUTION AND COMPUTATIONALLY EFFICIENT RADAR TECHNIQUES

(71) Applicant: QUALCOMM Incorporated, San Diego, CA (US)

(72) Inventors: Volodimir Slobodyanyuk, San Diego, CA (US); Roberto Rimini, San Diego, CA (US); Udara Fernando, San Diego, CA (US); Nitin Jonathan Myers, Austin, TX (US); Vijay Varadarajan, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 16/885,239

(22) Filed: May 27, 2020

(65) Prior Publication Data

US 2021/0373127 A1    Dec. 2, 2021

(51) Int. Cl.
*G01S 7/41* (2006.01)
*G01S 13/42* (2006.01)
(Continued)

(52) U.S. Cl.
CPC ............. *G01S 7/418* (2013.01); *G01S 7/352* (2013.01); *G01S 7/411* (2013.01); *G01S 7/414* (2013.01);
(Continued)

(58) Field of Classification Search
CPC .......... G01S 7/418; G01S 7/352; G01S 7/411; G01S 7/414; G01S 13/42; G06F 17/141; G06F 17/16; H01Q 3/42
(Continued)

(56) References Cited

U.S. PATENT DOCUMENTS 5,262,785 A * 11/1993 Silverstein ............ G01S 13/522
                                                                                    342/162
5,262,789 A * 11/1993 Silverstein ............... H01Q 3/22
                                                                                    342/368

(Continued)

FOREIGN PATENT DOCUMENTS

| EP | 3281026 A1 * | 2/2018 | ............... G01S 3/74 |
| WO | 2014020630 A1 | 2/2014 | |
| WO | WO-2014020630 A1 * | 2/2014 | ......... G01S 13/5244 |

OTHER PUBLICATIONS

Anonymous: "Gentle Introduction to Eigenvalues and Eigenvectors for Machine Learning", Feb. 19, 2018 (Feb. 19, 2018), pp. 1-14, XP55880005, Retrieved from the Internet: URL: https://machinelearningmastery.com/introduction-to-eigendecomposition-eigenvalues-and-eigenvectors/, [retrieved on Jan. 17, 2022], The whole document.

(Continued)

*Primary Examiner* — Nuzhat Pervin
(74) *Attorney, Agent, or Firm* — QUALCOMM Incorporated

(57) ABSTRACT

Methods, systems, computer-readable media, and apparatuses for determining one or more attributes of at least one target based on eigenspace analysis of radar signals are presented. In some embodiments, a subset of eigenvectors to use for forming a signal or noise subspace is identified based on principal component analysis. In some embodiments, the subset of eigenvectors is identified based on estimating the total number of targets using a discrete Fourier transform (DFT) or other spectral analysis technique. In some embodiments, a DFT is used to identify areas of interest in which to perform eigenspace analysis. In some embodiments, a DFT is used to estimate one attribute of a target, and eigenspace analysis is performed to estimate a different attribute of the target, with the results being combined to (Continued)

generate a multi-dimensional representation of a field of view.

12 Claims, 21 Drawing Sheets

(51) Int. Cl.
  *G06F 17/14* (2006.01)
  *G06F 17/16* (2006.01)
  *G01S 7/35* (2006.01)
  *H01Q 3/42* (2006.01)

(52) U.S. Cl.
  CPC ............ *G01S 13/42* (2013.01); *G06F 17/141* (2013.01); *G06F 17/16* (2013.01); *H01Q 3/42* (2013.01)

(58) Field of Classification Search
  USPC .......................................................... 342/93
  See application file for complete search history.

(56) References Cited

U.S. PATENT DOCUMENTS

| | | | | |
|---|---|---|---|---|
| 5,379,352 | A * | 1/1995 | Sirat | G06F 18/2135 382/276 |
| 5,583,951 | A * | 12/1996 | Sirat | G06F 17/16 382/254 |
| 7,103,537 | B2 * | 9/2006 | Witzgall | G10L 19/04 704/219 |
| 7,884,763 | B2 * | 2/2011 | Na | H01Q 3/30 342/377 |
| 8,116,871 | B2 * | 2/2012 | Zhang | A61N 1/3712 600/512 |
| 8,391,390 | B2 * | 3/2013 | Ponnampalam | H04B 7/043 375/267 |
| 8,755,837 | B2 * | 6/2014 | Rhoads | G06V 10/56 382/312 |
| 9,819,449 | B2 * | 11/2017 | Shattil | H04B 7/026 |
| 10,135,554 | B1 | 11/2018 | Sarrigeorgidis | H04B 7/08 |
| 10,327,221 | B1 * | 6/2019 | Sarrigeorgidis | H04L 25/0212 |
| 10,466,345 | B1 * | 11/2019 | Sarrigeorgidis | G01S 5/0221 |
| 10,587,369 | B1 * | 3/2020 | Shattil | H04J 13/004 |
| 10,637,544 | B1 * | 4/2020 | Shattil | H04B 7/0473 |
| 10,797,766 | B1 * | 10/2020 | Shattil | H04B 7/0452 |
| 2002/0065664 | A1 * | 5/2002 | Witzgall | G10L 19/04 704/E19.023 |
| 2003/0014248 | A1 * | 1/2003 | Vetter | G10L 21/0208 704/226 |
| 2005/0080619 | A1 * | 4/2005 | Choi | G03B 29/00 704/215 |
| 2006/0115030 | A1 * | 6/2006 | Erving | H04L 25/03114 375/348 |
| 2006/0265214 | A1 * | 11/2006 | Witzgall | G10L 19/04 704/219 |
| 2011/0307438 | A1 * | 12/2011 | Fernández Martínez | G01V 99/005 706/52 |
| 2012/0038506 | A1 * | 2/2012 | Kanamoto | G01S 13/584 342/158 |
| 2012/0242535 | A1 * | 9/2012 | Kanamoto | G01S 13/584 342/158 |
| 2012/0321204 | A1 * | 12/2012 | Fertik | G06F 18/2135 382/225 |
| 2013/0273968 | A1 * | 10/2013 | Rhoads | H04W 4/50 455/566 |
| 2014/0100449 | A1 * | 4/2014 | Begin | A61B 8/0841 600/424 |
| 2014/0146916 | A1 * | 5/2014 | Shattil | H04L 1/0681 375/295 |
| 2014/0146924 | A1 * | 5/2014 | Shattil | H04B 7/026 375/340 |
| 2014/0222749 | A1 * | 8/2014 | Fernandez Martinez | G01V 99/005 706/52 |
| 2015/0130655 | A1 * | 5/2015 | Aizawa | G01S 13/42 342/147 |
| 2016/0377713 | A1 * | 12/2016 | Kamo | G01S 7/35 342/157 |
| 2017/0097409 | A1 * | 4/2017 | Okamoto | G01S 13/34 |
| 2017/0276769 | A1 * | 9/2017 | Kishigami | G01S 7/0234 |
| 2017/0293025 | A1 * | 10/2017 | Davis | G01S 7/023 |
| 2017/0356991 | A1 * | 12/2017 | Yosoku | G01S 13/60 |
| 2018/0095171 | A1 * | 4/2018 | Cuichun | G01S 13/931 |
| 2018/0279884 | A1 * | 10/2018 | Ahmad | G01S 7/415 |
| 2019/0178985 | A1 * | 6/2019 | Roh | G01S 13/56 |
| 2020/0166616 | A1 * | 5/2020 | East-Lavoie | G01S 7/4865 |
| 2020/0191943 | A1 * | 6/2020 | Wu | G01S 13/726 |
| 2021/0262274 | A1 * | 8/2021 | Schatz | G01S 13/931 |
| 2021/0364616 | A1 * | 11/2021 | Wang | G01S 13/343 |
| 2022/0206107 | A1 * | 6/2022 | Popov | H04B 7/0617 |

OTHER PUBLICATIONS

Javier M., "Tutorial on Principal Component Analysis", Jul. 23, 2006 (Jul. 23, 2006), 9 Pages, XP55880012, Retrieved from the Internet: URL: https://inc.ucsd.edu/mplab/75/media/pca.pdf, [retrieved on Jan. 17, 2022], The whole document.
Partial International Search Report—PCT/US2021/024934—ISA/EPO—dated Jan. 28, 2022.
Schmidt, R.O, "Multiple Emitter Location and Signal Parameter Estimation," IEEE Trans. on Antennas and Propagation, vol. AP-34, No. 3 , (Mar. 1986), pp. 276-280.
International Search Report and Written Opinion—PCT/US2021/024934—ISA/EPO—dated Mar. 21, 2022.

* cited by examiner $$\mathbf{X} = \begin{bmatrix} e^{j\phi_1} & e^{j\phi_2} \\ e^{j2\phi_1} & e^{j2\phi_2} \\ \vdots & \vdots \\ e^{jM_R\phi_1} & e^{jM_R\phi_2} \end{bmatrix} \begin{bmatrix} \alpha_1 e^{j\omega_1 n} \\ \alpha_2 e^{j\omega_2 n} \end{bmatrix}_{n=1,2,\ldots,N} + \mathbf{W}$$

FIG. 11

HIGH RESOLUTION AND COMPUTATIONALLY EFFICIENT RADAR TECHNIQUES

BACKGROUND

Aspects of the present disclosure relate to techniques for detecting attributes of a radar target (e.g., range, azimuth, elevation, speed, etc.) by performing analysis of a received radar signal in an eigenspace generated from received radar signals.

One approach to radar detection involves the use of a discrete Fourier transform (DFT) to identify attributes of a radar target. Another, much less computationally efficient, approach uses a technique known as MUSIC (Multiple Emitter Location and Signal Parameter Estimation). A MUSIC algorithm performs analysis on an eigenspace comprising a signal subspace representing received radar signals and a noise subspace representing Gaussian white noise. The eigenspace is constructed by extracting eigenvalues and corresponding eigenvectors from a covariance matrix generated from received radar signals. MUSIC is less computationally efficient because the eigenspace can be quite large depending on the number of antenna elements and the number of parameters or attributes being determined. Because it is computationally expensive, MUSIC (and eigenspace based methods in general) are not suitable for real-time applications such as automotive radar.

Additionally, most radar methods are not suitable for detecting nearby objects (e.g. where the target distance is equal to or less than the wavelength of a transmit signal). For example, in a Frequency-Modulated Continuous-Wave (FMCW) radar system, energy coupling between a transmit antenna element and a receive antenna element can make the energy of a signal received from a target hard to distinguish using conventional DFT-based digital processing.

In an automotive setting, ultrasonic sensors are one alternative to radar detection of targets. Ultrasonic sensors have their own disadvantages. For instance, installing ultrasonic sensors in an automobile typically requires drilling holes into a bumper of the automobile, compromising structural integrity and aesthetics. Additionally, the piezoelectric resonators in ultrasonic sensors can be sensitive to temperature variation, requiring compensation circuits and time-consuming calibration. Ultrasonic sensors are also much less accurate than radar for detecting objects that have a small surface area (e.g., a narrow pole) or objects with flat surfaces angled such that sound waves are deflected away from the sensor.

BRIEF SUMMARY

Certain embodiments are described that provide techniques for detecting attributes of a radar target based on eigenspace analysis. In some embodiments, an eigenspace technique (e.g., using MUSIC) is combined with processing performed using DFT or other spectral analysis techniques so that processing can be performed more efficiently compared to using the eigenspace technique alone. Certain embodiments are also directed to improving the accuracy and efficiency of eigenspace analysis by performing preprocessing to identify relevant portions of an eigenspace, or areas of interest, and eliminating non-relevant portions or areas from consideration.

In certain embodiments, a radar apparatus includes a signal generator, a plurality of antennas, and one or more processors. The signal generator is configured to generate a radar signal for transmission. The plurality antennas are configured to receive a reflected radar signal after the radar signal is reflected back (e.g., from a target). Each antenna of the plurality of antennas generates a respective received signal in response to the reflected radar signal. The one or more processors are configured to generate a signal array as a digital representation of the received signals and calculate a covariance matrix using the signal array. The one or more processors are further configured to determine, using principal component analysis, one or more eigenvectors of the covariance matrix, and to determine one or more attributes of at least one target based on the one or more eigenvectors. The one or more eigenvectors comprise a subset of all eigenvectors of the covariance matrix.

In certain embodiments, one or more processors of a radar apparatus are configured to perform spectral analysis on received signals to generate an initial estimate of a total number of targets in a field of view, generate a signal array as a digital representation of the received signals, and calculate a covariance matrix using the signal array. The one or more processors are further configured to determine eigenvectors of the covariance matrix along with eigenvalues corresponding to the eigenvectors, and to generate a final estimate of the total number of targets using the eigenvalues and the initial estimate.

In certain embodiments, one or more processors of a radar apparatus are configured to perform spectral analysis on received signals to identify areas of interest containing potential targets, generate a signal array as a digital representation of the received signals, and calculate a covariance matrix using the signal array. The one or more processors are further configured to determine eigenvectors of the covariance matrix along with eigenvalues corresponding to the eigenvectors, form a subspace using a subset of the eigenvectors of the covariance matrix, and generate a steering array comprising vectors representing responses of a plurality of antennas to signals received from different directions in a field of view. After generating the steering array, the one or more processors generate a set of projections by projecting a subset of vectors from the steering array onto the subspace, then generate a pseudo spectrum based on the set of projections. The subset of vectors corresponds to the areas of interest.

In certain embodiments, one or more processors of a radar apparatus are configured to apply a discrete Fourier Transform (DFT) to received signals to generate a set of bins in a range domain, identify a first bin from the set of bins as corresponding to one or more targets, generate a first signal array as a digital representation of a portion of the received signals corresponding to the first bin, and calculate a first covariance matrix using the first signal array. The one or more processors are further configured to determine eigenvectors of the first covariance matrix along with eigenvalues corresponding to the eigenvectors of the first covariance matrix, form a first subspace using a subset of the eigenvectors of the first covariance matrix, generate a steering array comprising vectors representing responses of a plurality of antennas to signals received from different directions in a field of view, and generate a first set of projections by projecting vectors from the steering array onto the first subspace. Additionally, the one or more processors are configured to generate a first pseudo spectrum based on the first set of projections and determine a direction of arrival of a first target based on the first pseudo spectrum.

BRIEF DESCRIPTION OF THE DRAWINGS

Aspects of the disclosure are illustrated by way of example. In the accompanying figures, like reference numbers indicate similar elements.

FIG. 11 illustrates the applicability of MUSIC to the problem of estimating an angle of arrival.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the appended claims.

Figure 1:
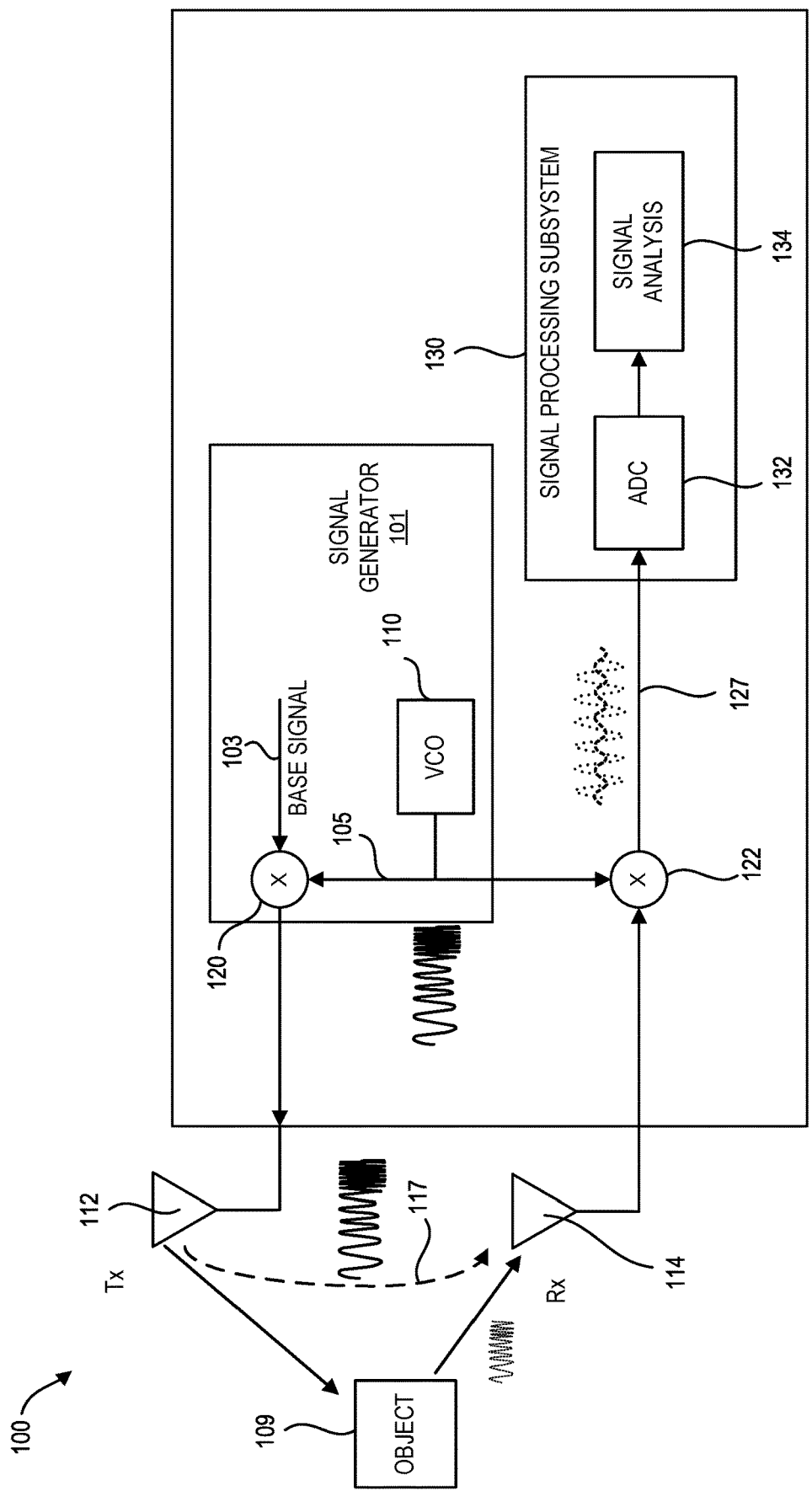
FIG. 1 illustrates a simplified diagram of a radar system in which certain embodiments of the present disclosure can be implemented.

FIG. 1 illustrates an example radar system 100 in which certain embodiments of the present disclosure can be implemented. The radar techniques described herein can be used to detect targets in any number of scenarios, including land based, flying, and waterborne targets. In general, a target can be any physical object, such as a person, a traffic sign, a vehicle, and so on. Thus, the radar techniques described herein have numerous practical applications. As will become apparent from the discussion below, the embodiments described herein offer significant performance improvements compared to conventional radar systems, especially in situations where a target is located close enough to cause transmitter-to-receiver leakage or when there are multiple targets close to one another.

In certain embodiments, a radar system implementing one or more of the radar techniques described herein (e.g., the radar system 100) is a component within a motor vehicle and is used to detect targets in connection with providing assistance to an operator of the motor vehicle (e.g., parking assistance to a human driver or an autonomous computer-based agent). For example, antennas of the radar system 100 can be installed on a vehicle such that radar signals are transmitted from and received at antennas facing one or more sides of the vehicle (e.g., front and/or rear). In an automotive setting, the radar system 100 could be used to detect stationary or moving targets that are often encountered when driving, such as poles, traffic signs, street curbs, pedestrians, walls, support columns or beams, and the like. Accordingly, the radar system 100 could be coupled or incorporated to a vehicle controller (e.g., an electronic control unit or a sensor controller) so that information about targets detected by the radar system 100 (e.g., location, speed, distance, direction) is communicated from the radar system 100 to the vehicle controller to allow the vehicle controller to initiate, based on the communicated information, some action with respect to the operation of the vehicle (e.g., controlling steering, acceleration, or braking, or displaying a map showing the targets in the vehicle's environment). For instance, the vehicle controller may use the information from the radar system 100 to determine a path from the vehicle's present location to another location (e.g., a parking space) based on safety considerations such as collision avoidance. As another example, the vehicle controller may use the information from the radar system 100 to actively monitor targets in the vehicle's environment while the vehicle is traveling in order to determine whether a vehicle maneuver (e.g., a lane change, a change in speed, a turn, and the like) is necessary to avoid an imminent collision or reduce the likelihood of a potential collision, or to determine whether a vehicle maneuver requested by the vehicle's operator (e.g., a manual steering or braking input) can be performed safely.

In some embodiments, a radar system implementing one or more of the radar techniques described herein may be a component of a mobile or handheld computing device (e.g., a smartphone or wearable headset). For example, in certain embodiments, the radar system 100 can be used to convey information about targets to an augmented reality application executing on a processor of a smartphone. The augmented reality application could then generate an augmented reality presentation based on the information about the targets (e.g., by placing a virtual object into an augment reality scene in a location relative to the location of a target and updating the location of the virtual object so that the virtual object tracks a movement of the target). As another example, the radar system 100 can be integrated into or coupled to a wearable headset so that information about targets is used by an application executing on a processor of the headset to assist a user of the headset in navigating their local environment while wearing the headset.

The radar system 100 is an FMCW radar system that includes a voltage-controlled oscillator (VCO) 110. The VCO 110 is a component of a signal generator 101 that generates a frequency-modulated sinusoidal signal 105 whose frequency varies over time. VCO 110 is not limited to any particular type of VCO and can be implemented, for example, using a crystal oscillator, an inductor-capacitor circuit, or other VCO designs. The frequency modulated sinusoidal signal 105 is combined with a base signal 103 produced by the signal generator 101. In particular, a mixer 120 multiplies the base signal 103 with the sinusoidal signal 105 to generate a frequency-shifted version of the signal 105 for transmission via a transmit (Tx) antenna 112. VCO 110 is merely an example of one way to implement a signal generator configured to generate a radar signal for transmission by an transmit antenna. For instance, VCO 110 can be substituted with a digitally controlled oscillator (DCO), such as a frequency synthesizer, configured to generate a signal whose frequency depends on a digital control signal produced by the signal generator 101. As another example, in certain embodiments, a radar system implementing one or more of the radar techniques described herein may be a pulse radar system in which radar signals are transmitted as pulses instead of continuous waves. Thus, the signal generator 101 could be implemented using a pulse generator configured to generate a pulsed signal (e.g., a sequence of chirped pulses as the base signal 103), where the pulsed signal is mixed with a signal produced by a local oscillator (LO) configured to output a signal having a fixed frequency to form a radar signal for transmission.

The transmit antenna 112 can be configured to transmit the frequency-shifted version of the signal 105 in an omnidirectional fashion, i.e., transmit antenna 112 can be an omnidirectional antenna. Additionally, in some embodiments, the transmit antenna 112 may be operated using beamforming to transmit a directional beam by phase shifting the signal 105 after the signal has been frequency-shifted. Thus, in some embodiments, the input to the transmit antenna 112 may be supplied by a phase shifter coupled to the output of the mixer 120.

The signal from the transmit antenna 112 is reflected off an object 109 corresponding to a radar target and collected at a receive (Rx) antenna 114. Like the transmit antenna 114, the receive antenna 114 can, but does not have to be, omnidirectional. The signal received at the receive antenna 114 is essentially a delayed and weaker version of the signal sent from the transmit antenna 112 and is mixed with the frequency modulated sinusoidal signal 105 generated by the VCO 110 to demodulate the received radar signal and generate a signal 127. The demodulation is typically performed in the analog domain, using an analog beating operation (depicted as a mixer 122) that generates the signal 127 as a continuous-wave sinusoid whose frequency is proportional to the time delay between transmission and reception, and therefore proportional to the distance of the object 109.

Although only one transmit antenna 112 and one receive antenna 114 are shown in FIG. 1, the radar system 100 can include multiple transmit antennas (e.g., a transmit antenna array) configured to transmit a radar signal and multiple receive antennas (e.g., a receive antenna array) configured to receive a reflected radar signal after the radar signal is reflected back. In particular, each antenna of a receive antenna array can be configured to receive a reflected radar signal corresponding to a radar signal that has been transmitted by a transmit antenna array and reflected back (e.g., off a target in the environment). The transmit antenna array can be separate from the receive antenna array. Alternatively, in some implementations, an antenna array of the radar system 100 includes one or more antennas that are switched between being operated as transmit antennas and being operated as receive antennas. When the radar system 100 is implemented using a transmit antenna array or a receive antenna array, the antenna elements of the array are typically equidistantly spaced apart. For example, an antenna array can be formed as a one-dimensional antenna array with antennas arranged along a line, where adjacent antennas are separated by the same distance. An antenna array can also be a two-dimensional array (e.g., a receive antenna array with multiple rows of receive antennas).

The number of transmit antenna elements does not have to be the same as the number of receive antenna elements. For instance, in one embodiment, a single transmit antenna 112 is used to transmit the frequency-shifted version of the signal 105 in an omnidirectional fashion (as discussed above) and multiple receive antennas 114 are configured to receive reflected radar signals (e.g., reflections of the signal transmitted by the single transmit antenna 112 arriving from different directions after reflecting off a target). As another example, in another embodiment, multiple transmit antennas are used to transmit phase-shifted signals that combine through constructive or destructive interference to form a beam emitted in a desired direction (e.g., ninety degrees from the transmit antenna array). Similarly, beamforming can be applied to antennas in a receive antenna array by phase-shifting the reflected radar signals.

Due to the presence of one or more coupling or leakage paths 117 between the transmit antenna 112 and the receive antenna 114, the signal 127 is a composite signal that represents the energy of the signal received from the object 109 as well as the energy of the coupling. This is because the leakage energy is processed, together with the received signal from the object 109, by the mixer 122. Although FIG. 1 depicts the coupling path as being over the air, transmitter-to-receiver mutual coupling can also occur along circuit paths, e.g., through a circuit substrate on which the transmit and receive antennas are mounted. The strength of the coupling depends on the distance between the transmit and the receive antennas. If transmit antenna 112 and the receive antenna 114 are sufficiently close to each other, then the leakage energy can obscure the reflection from the object 109.

Figure 2:
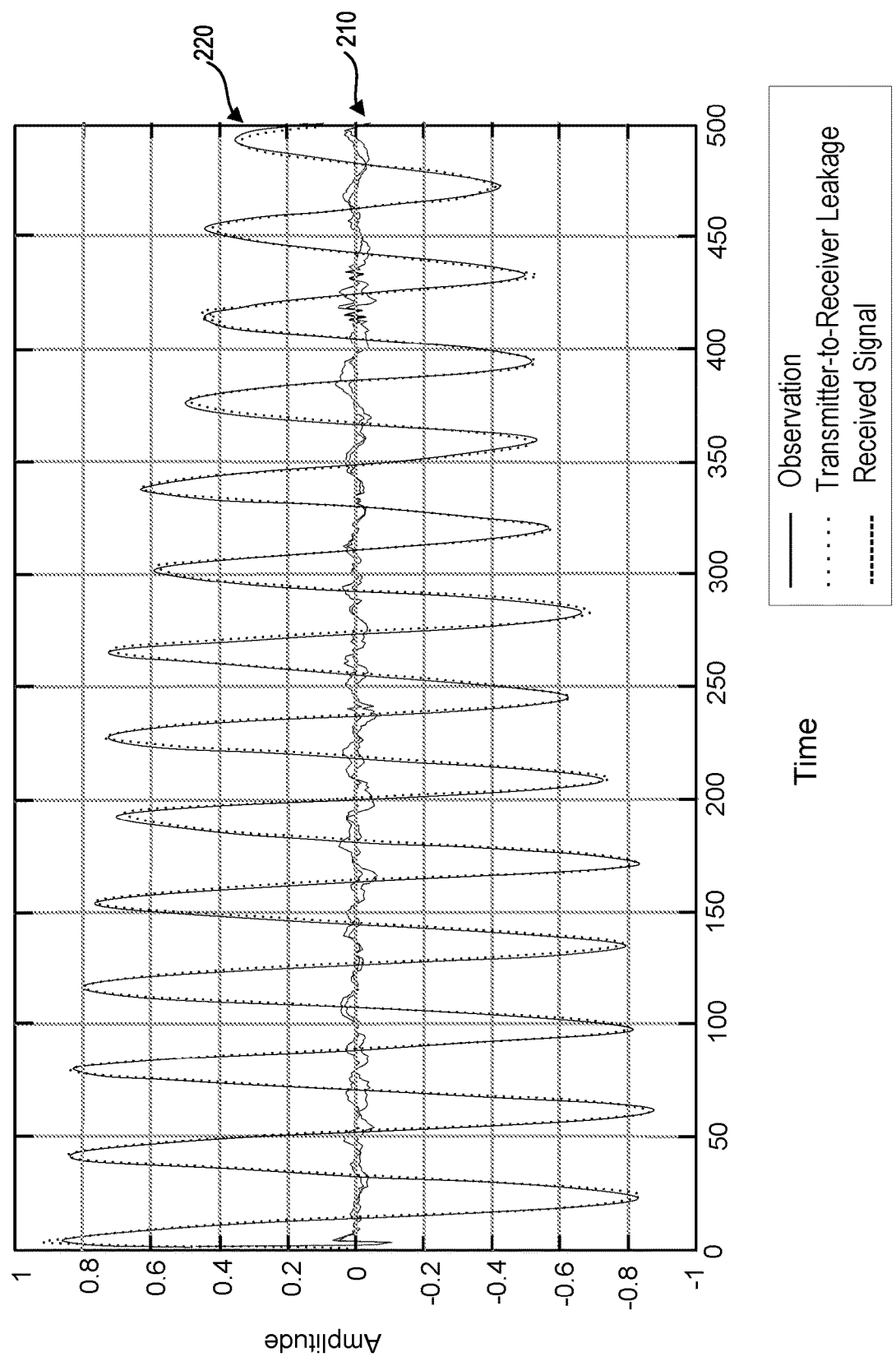
FIG. 2 illustrates an example of a composite sinusoidal signal reconstructed from a received radar signal and in the presence of transmitter-to-receiver leakage.

FIG. 2 illustrates an example of a composite sinusoidal signal reconstructed from a received radar signal and in the presence of transmitter-to-receiver leakage. The composite sinusoidal signal corresponds to signal 127 in FIG. 1 and comprises a first sinusoid 210 corresponding to the signal received from a target and a second sinusoid 220 corresponding to the transmitter-to-receiver leakage. As shown in FIG. 2, the sinusoid 210 has a much lower amplitude than the sinusoid 220. Therefore, the leakage energy overpowers the energy from the target, making it difficult if not impossible to detect the target. The scenario represented in FIG. 2 can occur when the target is located nearby, for example, at a distance approximately equal to or less than the wavelength of the transmit signal, so that the target is within the near field of the transmit antenna.

Returning to FIG. 1, the signal 127 is converted into a digital signal by an analog-to-digital converter (ADC) 132 within a signal processing subsystem 130. The signal processing subsystem 130 can be located on the same radar device that houses the transmit antenna 112 and the receive antenna 114. Alternatively, at least some components of the signal processing subsystem 130, such as one or more processors or circuitry that perform signal analysis (represented by block 134) can be remotely located. The signal analysis performed by the signal processing subsystem 130 involves determining one or more attributes of the object 109, for example, the object's distance (e.g., a range measurement based on Doppler effect), or direction of arrival (e.g., an azimuth and/or elevation measurement). For example, the signal analysis may involve digital signal processing, including applying a DFT to the output of the ADC 132 to generate a range spectrum, and then detecting a peak in the range spectrum to estimate the distance of the object 109 as corresponding to a frequency or range bin where the peak is located. As indicated above, the ability to detect a target using conventional radar processing (e.g., using only DFT detection) is dependent on the target being far enough away so that the signal from the target is not overpowered by the transmitter-to-receiver leakage.

Signal processing subsystem 130 can be implemented using hardware, software, or a combination of hardware and software. For example, in some embodiments, the signal processing subsystem 130 includes a digital signal processor (DSP) configured to executed program code stored on a non-transitory computer-readable storage medium, where the program code causes the DSP to perform processing in accordance with the radar techniques described herein. Alternatively, the signal processing subsystem 130 can be implemented as an application-specific integrated circuit (ASIC), a field-programmable gate array (FPGA), or other circuitry. Signal processing subsystem 130 can also include more than one processors (e.g., a combination of general purpose and/or special purpose processors such as DSPs). Accordingly, it will be understood that FIG. 1 is merely an example of one way to implement a signal processing subsystem, with other implementations being possible. For instance, although shown in FIG. 1 as operating in the digital domain, the signal processing subsystem 130 could be configured to perform certain processing steps in the analog domain. For example, in certain embodiments, eigen decomposition may be performed using analog circuitry in the signal processing subsystem 130.

Figure 3A:
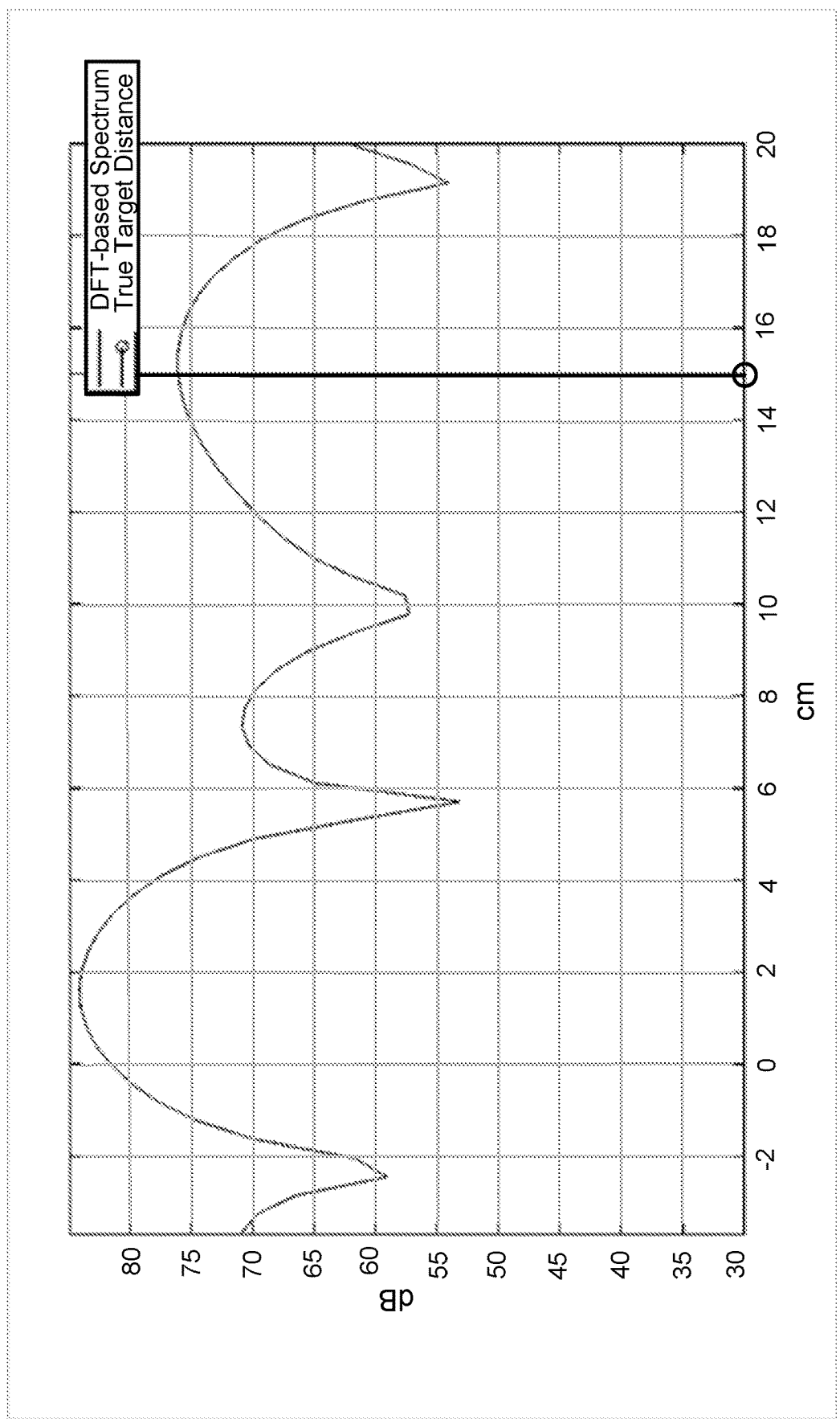
FIG. 3A illustrates an example of a range spectrum generated using a DFT when there is transmitter-to-receiver leakage and the target is sufficiently far away to enable the target to be resolved.

FIG. 3A illustrates an example of a range spectrum generated using a DFT (implemented with a Fast Fourier Transform (FFT)) when there is transmitter-to-receiver leakage and the target is sufficiently far away to enable the target to be resolved. As shown in FIG. 3A, the leakage energy is represented by a lobe centered around 1.5 centimeters (cm), and the target is represented by a lobe centered around 15 cm. Although the leakage energy is stronger than the energy of the signal from the target (expressed in FIG. 3A in decibels (dB)), the target can nevertheless be resolved because the lobes are well-separated.

Figure 3B:
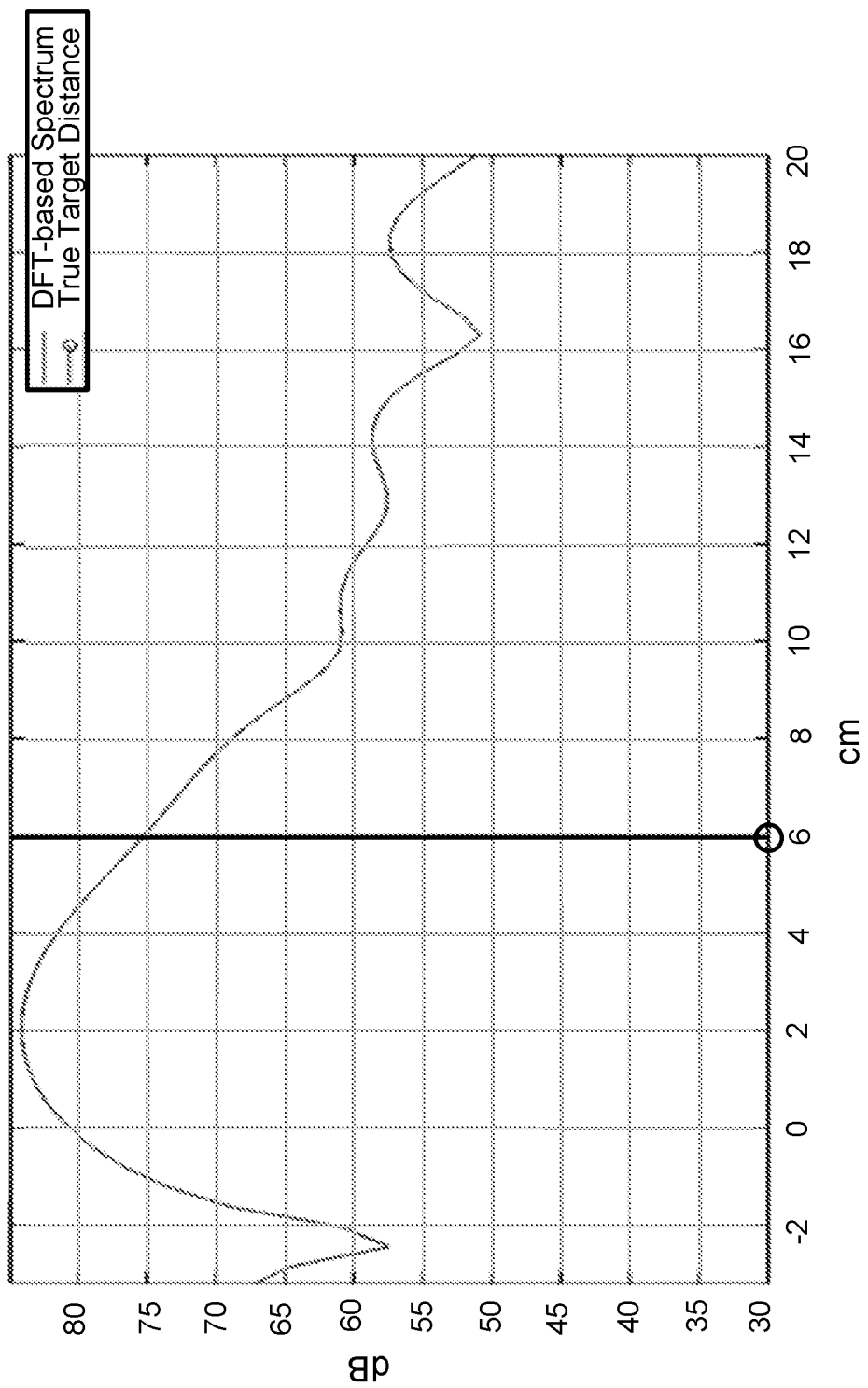
FIG. 3B illustrates an example of a range spectrum generated using a DFT when there is transmitter-to-receiver leakage and the target is too nearby to enable the target to be resolved.

FIG. 3B illustrates an example of a range spectrum generated using a DFT when there is transmitter-to-receiver leakage and the target is too nearby (in this example, at a distance of 6 cm) to enable the target to be resolved. In FIG. 3B, instead of two well-separated lobes, there is a single lobe centered around 1.5 cm.

In addition to leakage, a significant limitation for the successful implementation of radar for automotive applications (e.g., self-parking in autonomous vehicles operating at Society of Automotive Engineers (SAE) autonomy level 3 or higher) is low angular resolution, which limits the ability of the radar sensor to resolve multiple targets located close to each other or identify a target's location within a particular lane. In order to overcome the problem of resolving nearby objects in the presence of transmitter-to-receiver leakage in automotive and other applications, and to improve upon the accuracy with which an object is measured (e.g., with an enhanced degree of angular resolution), techniques are described herein which involve the use of an eigenspace analysis that can be performed, for example, as part of the signal analysis done by the signal processing subsystem 130 in FIG. 1.

Figure 4:
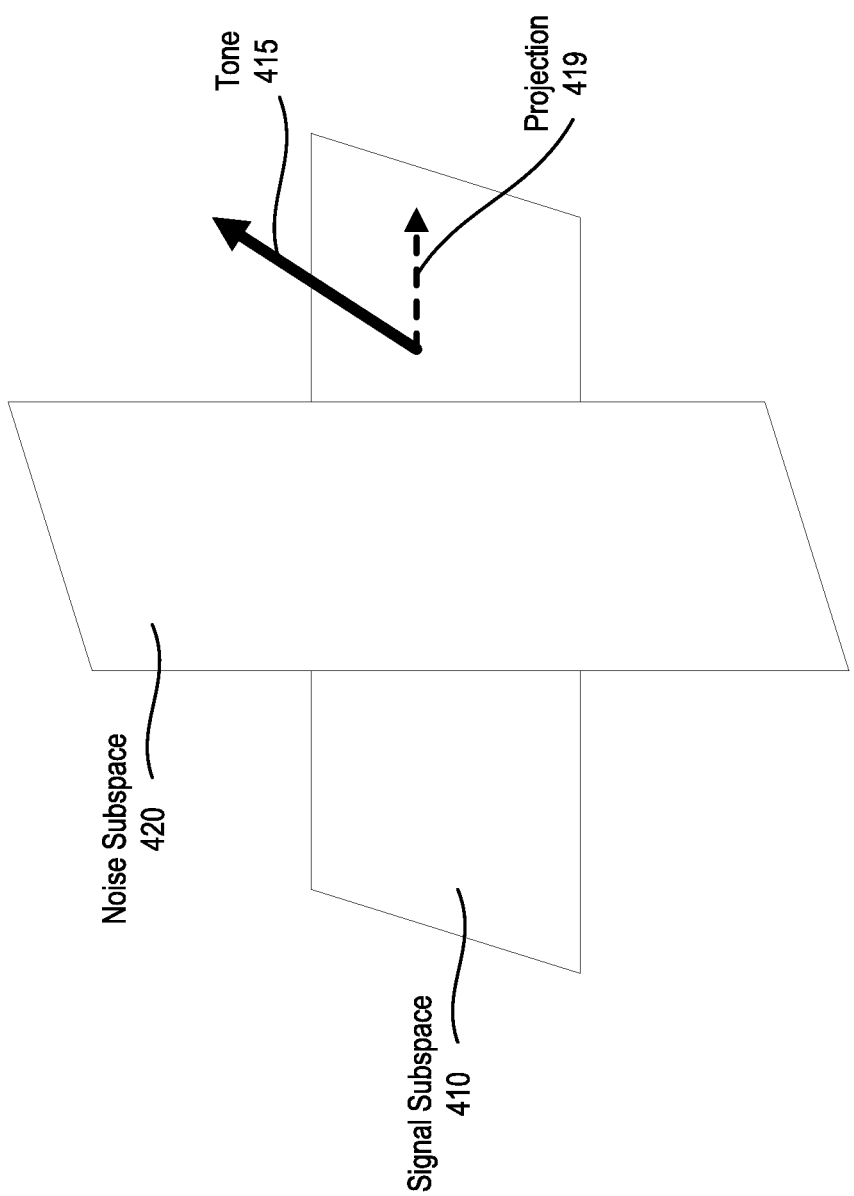
FIG. 4 illustrates an example of processing performed in an eigenspace to generate a pseudo spectrum usable for detecting a target.

In certain embodiments, the eigenspace analysis includes processing using a MUSIC algorithm. In the MUSIC approach, received radar signals are processed to construct an eigenspace that represents the received signals plus Gaussian noise. As shown in FIG. 4, the eigenspace comprises a signal subspace and a noise subspace that is orthogonal to the signal subspace.

FIG. 4 illustrates an example of processing performed in an eigenspace to generate a pseudo spectrum usable for detecting a target. In FIG. 4, the eigenspace includes a plurality of eigenvectors that form a signal subspace 410 and a plurality of eigenvectors that form a noise subspace 420. In a MUSIC algorithm, the eigenvectors and their corresponding eigenvalues are computed from a covariance matrix, where the covariance matrix is generated using signals received by one or more antenna elements. MUSIC models the signal X received by an antenna array with M antenna elements and from D targets as follows:

$$\begin{bmatrix} x_1 \\ x_2 \\ \vdots \\ x_M \end{bmatrix} = [a(\theta_1)a(\theta_2) \ \ldots \ a(\theta_D)] \begin{bmatrix} s_1 \\ s_2 \\ \vdots \\ s_D \end{bmatrix} + \begin{bmatrix} w_1 \\ w_2 \\ \vdots \\ w_M \end{bmatrix} \text{ or } X = As + w$$

where each column of matrix A is a steering vector $a(\theta)$ of responses from each of the M antenna elements to the direction of arrival $\theta$ of a particular incident signal (e.g., responses to an incident signal from a particular direction within a field of view), s is a vector containing the received signal waveforms, i.e., each element $s_i$ of the vector s is a time-domain waveform corresponding to a given signal with incident angle $\theta_i$, and w is a complex vector representing noise. The elements of X and A are also complex in general.

The MUSIC algorithm computes the covariance matrix for the X matrix, along with eigenvectors and their corresponding eigenvalues of the covariance matrix. The eigenvectors belong either to the signal subspace or the noise subspace. The steering vectors corresponding to the direction of arrival lie in the signal subspace and are hence orthogonal to the noise subspace. By searching through all possible steering vectors to find those which are perpendicular (orthogonal) to the space spanned by the noise eigenvectors, the directions of arrival can be estimated.

To determine the directions of all incident sources (i.e., targets), typically every angle $\theta$ in the field of view is analyzed to compute a pseudo spectrum $P_{MU}(\theta)=1/d^2$ that is inversely proportional to the norm of the projection of any particular steering vector Y onto the noise subspace:

$$d^2 = Y^* E_N E_N^* Y$$

-continued $$P_{MU}(\theta) = \frac{1}{a^*(\theta)E_N E_N^* a(\theta)}$$

where $E_N$ is an M×N matrix whose columns are the noise eigenvectors. A separate column is provided for each eigenvector in a set of N number of noise eigenvectors. The angles of the incident sources are angles where the norm is minimized and are thus angles associated with peaks in the pseudo spectrum. The pseudo spectrum can similarly be computed by projecting onto the signal subspace to locate angles where the norm is maximized (this is illustrated in FIG. 4).

MUSIC can be applied to estimate the direction of arrival of a source signal, as well as other attributes of a target. In the example of FIG. 4, the attribute being estimated is range. A tone 415 is mathematically represented by a vector (analogous to the steering vector described above for angular resolution) and corresponds to a continuous wave or sinusoidal signal at a particular frequency. This frequency can be varied to project the resulting tones onto the signal subspace 410 and compute the energy of the projection. The energy $E_{proj}$ of a projection 419 is analogous to the norm of the projection described above and can vary in value between 0 and 1. In the case of a discrete time complex tone $$s(\omega_k) = e^{j2\pi \frac{f_k}{f_s}}$$

at frequency $f_k$ where fs is a sample rate (e.g., 1 Hertz), the energy of the projection can be calculated as a function of the inner product of the tone and the eigenvector matrix $V_s$ generated from the covariance matrix of the received signals, e.g., the square of the L2 norm of the inner product: $\|s^H(\omega_k) \cdot V_s\|^2$.

If a tone at a particular frequency lies in the signal subspace 410, then the energy of the projection is approximately equal to 1. Therefore, the residual energy $(1-E_{proj})$ is minimized. The pseudo spectrum can be calculated as a function of the reciprocal of the residual energy, so that the amplitude of the pseudo spectrum is maximized when the tone lies in the signal subspace, for example:

$$\text{Pseudo Spectrum} = 10 \log\left(\frac{1}{1 - Eproj}\right)$$

Figure 5:
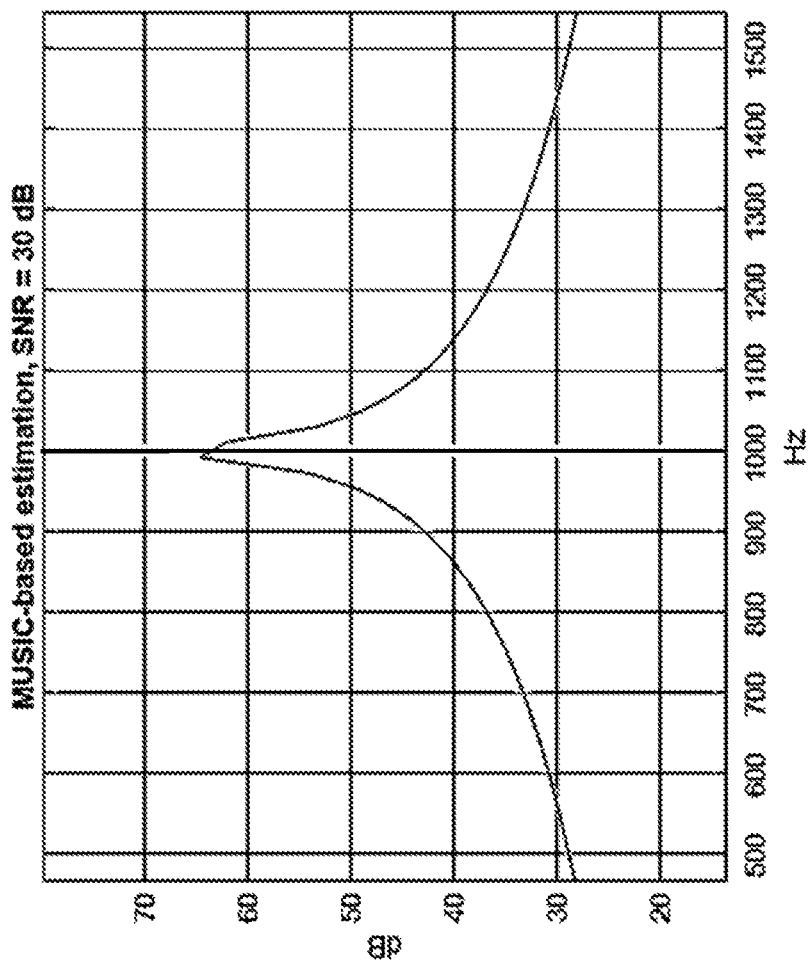
FIG. 5 illustrates a plot of a pseudo spectrum generated by projecting tones of varying frequency onto a signal subspace.

FIG. 5 illustrates a plot of a pseudo spectrum generated by projecting tones of varying frequency onto a signal subspace. The amplitude of the pseudo spectrum is expressed in decibels as a function of frequency. In the example of FIG. 5, the tones are varied in frequency between 500 and 1,500 Hertz (Hz). As shown in FIG. 5, the pseudo spectrum peaks at a frequency of 1,000 Hz, which can be mapped onto the distance of a target.

MUSIC offers greater angular resolution compared to DFT-based detection, but is computationally expensive. A primary source of the computational complexity of the MUSIC algorithm is the need to extract eigenvalues and corresponding eigenvectors from the covariance matrix of the signal array X. This is a computationally intensive operation, making implementation of MUSIC challenging for real time applications such as automotive radar.

Another source of computational complexity is the need to search through all possible steering vectors a(θ) of the steering array A, which requires multiplication of the large complex-valued matrixes. The dimensionality of the steering array A depends on the attributes being estimated. MUSIC applied to estimate a single attribute/parameter is referred to herein as 1D MUSIC. If two or more attributes (e.g., range and azimuth, or azimuth and elevation) are to be estimated (2D MUSIC), then the steering array A is represented by a complex matrix with $(A_{Num\ Ang\ Points} \times R_{Num\ Range\ points} \times E_{Num\ Elem\ Noise\ Array})^2$ number of complex elements, i.e., the number of angular points multiplied by the number of range points/bins, multiplied by the number of elements in the noise array, where the number of elements in the noise array is equal to the number of receive antenna elements.

Additionally, the determination of the signal and noise subspaces in MUSIC depends on accurate estimation of the number of targets in the field of view. In contrast, DFT-based detection does not require advance knowledge of the number of targets. Typically, the number of targets is derived from the shape of the distribution of eigenvalues, where "large" eigenvalues are associated with targets and "small" eigenvalues are associated with noise. It can be difficult to determine from the distribution how many targets there are. If the number of targets is estimated incorrectly, then the subspaces and the resulting pseudo spectrum generated by projecting onto either subspace will not be accurate. MUSIC can calculate the number of eigenvalues and eigenvectors, but does not by itself provide a way to properly estimate the number of targets.

Figure 6:
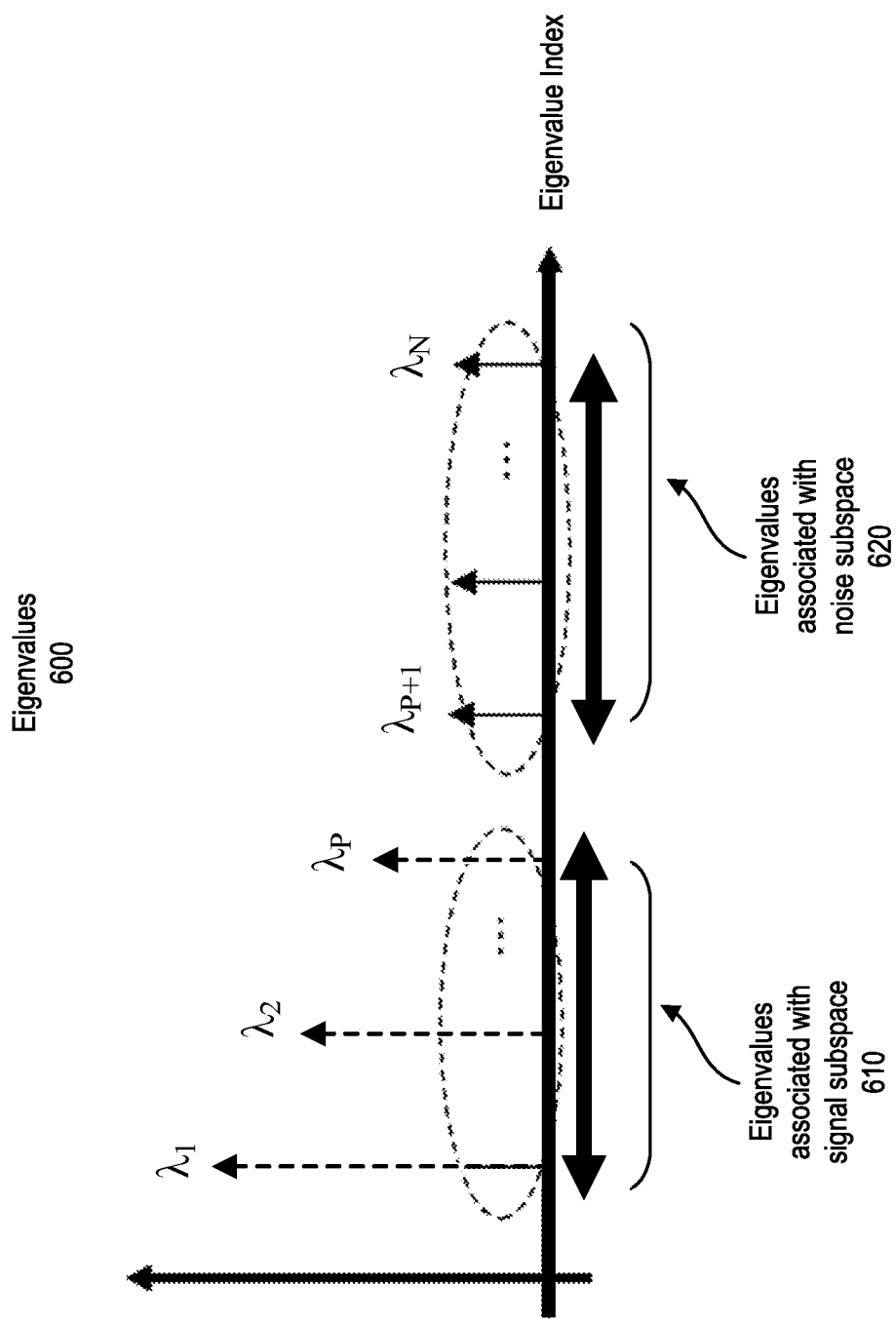
FIG. 6 illustrates a set of eigenvalues that have been sorted from largest to smallest.
Figure 7:
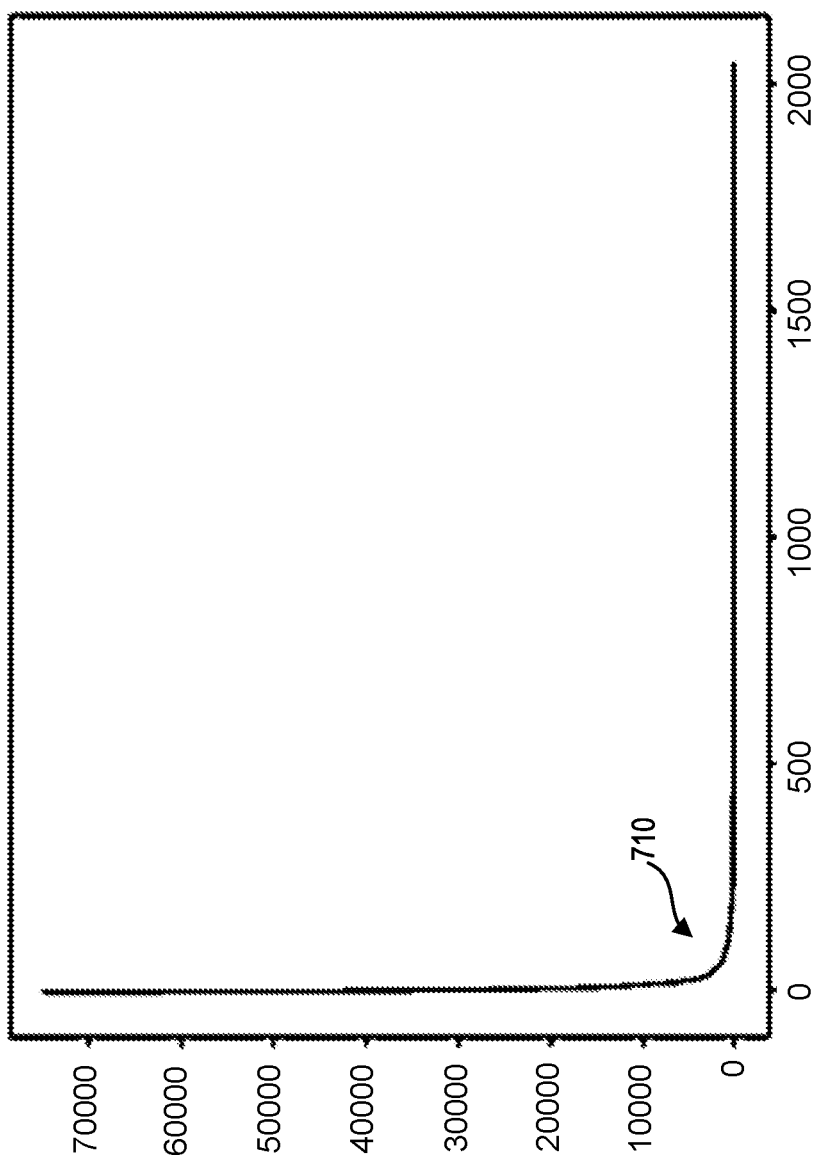
FIG. 7 illustrates an eigenvalue distribution on a linear scale.
Figure 8:
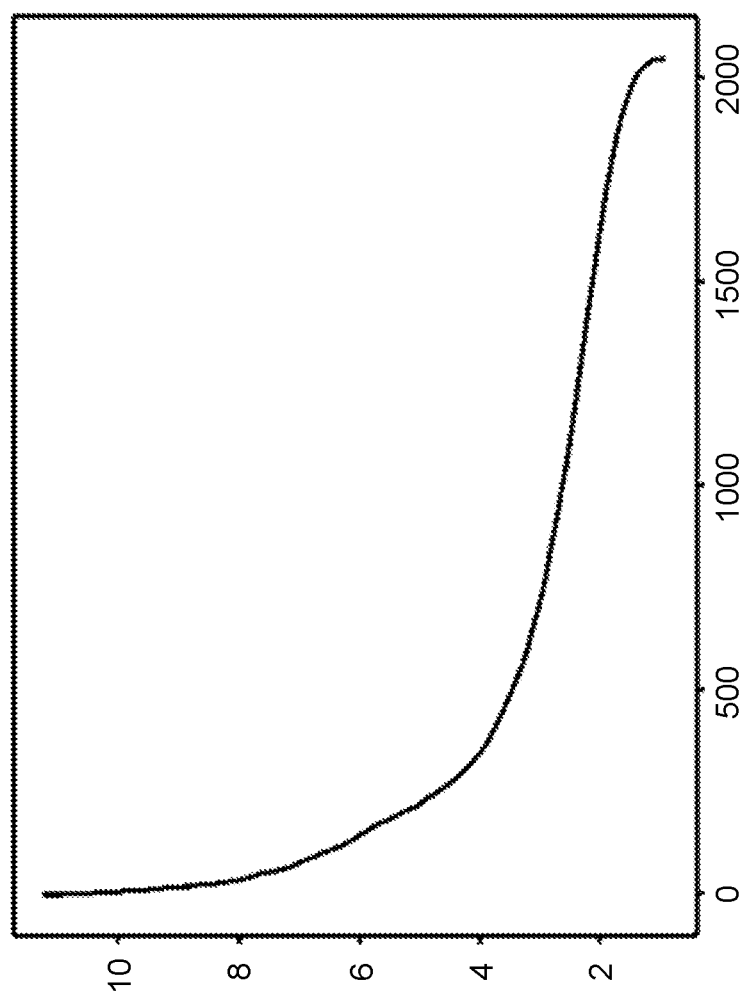
FIG. 8 illustrates the eigenvalue distribution of FIG. 7 as a logarithm.

FIG. 6 illustrates a set 600 of eigenvalues that have been sorted from largest to smallest. In general, the values in a set 610 of eigenvalues associated with the signal subspace are much larger than values in a set 620 of eigenvalues associated with the noise subspace. The eigenvalues associated with the noise subspace are usually of similar magnitude. As illustrated in FIGS. 7 and 8, identifying which eigenvalues are associated with the signal subspace (the remaining eigenvalues being associated with the noise subspace) can be difficult.

FIG. 7 illustrates an eigenvalue distribution on a linear scale. Although only a few eigenvalues are shown in FIG. 6 for illustration purposes, in practice the number of eigenvalues can be quite large (e.g., on the order of a hundred). As shown in FIG. 7, the distribution curve is characterized by a knee or bend 710 that marks the boundary between eigenvalues associated with the signal subspace and eigenvalues associated with the noise subspace. Precisely identifying the location of the knee 710 is a non-trivial task. This is illustrated more clearly in FIG. 8, which shows the same distribution as in FIG. 7, but as a logarithm. The axes in FIG. 8 are not labeled according to a log scale (e.g., intervals of 100, 1000, 10000, and so on). However, the eigenvalue distribution in FIG. 8 corresponds to a result of applying a logarithmic (log) function to the eigenvalue distribution in FIG. 7, and is therefore a log view of the same eigenvalue distribution. As shown in FIG. 8, when the eigenvalue distribution is viewed as a logarithm, the location of the knee cannot be precisely identified through evaluating the eigenvalue distribution alone.

Figure 9:
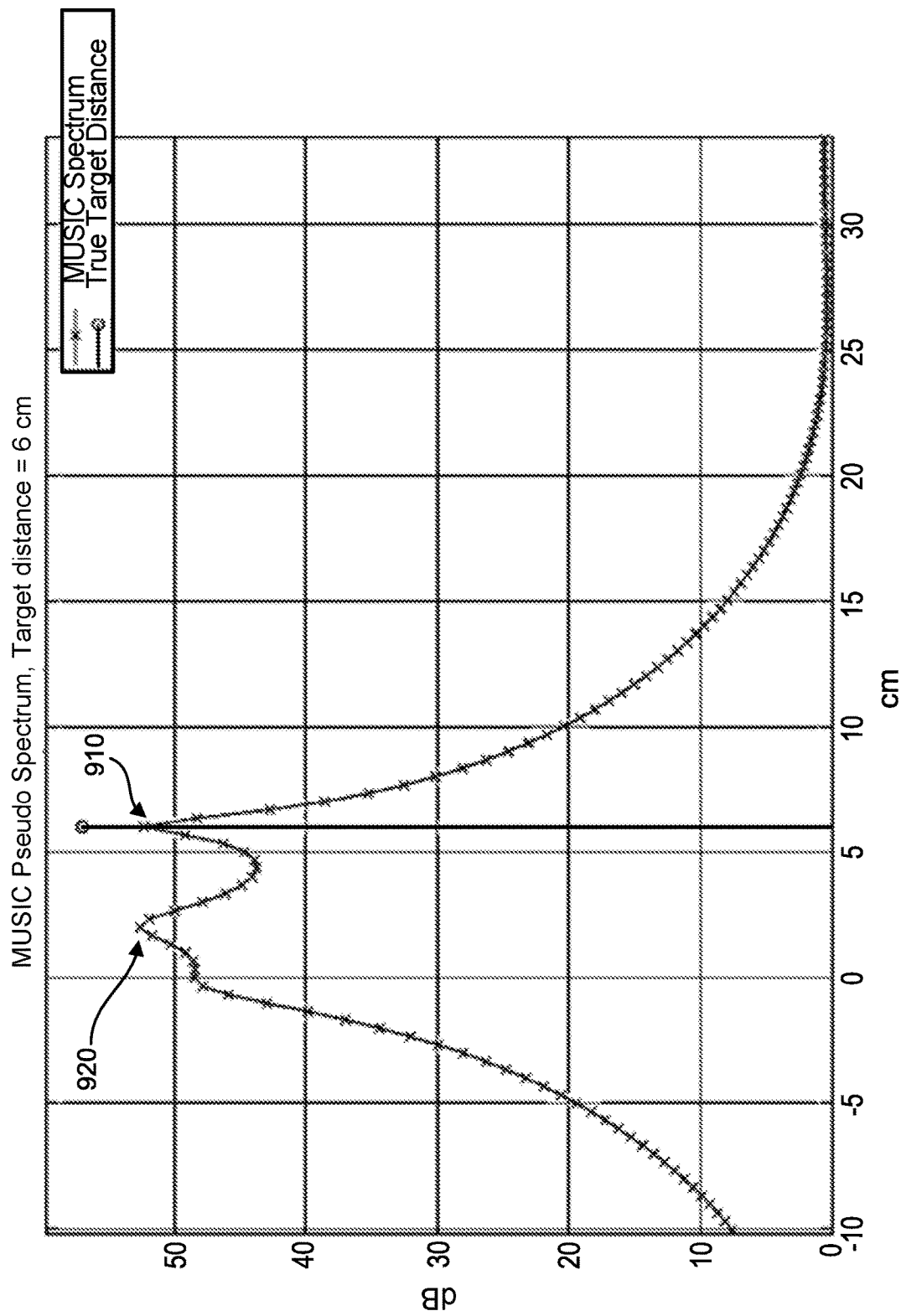
FIG. 9 illustrates an example of a pseudo spectrum generated using MUSIC in the presence of transmitter-to-receiver leakage.

FIG. 9 illustrates an example of a pseudo spectrum generated using MUSIC in the presence of transmitter-to-receiver leakage. The pseudo spectrum in FIG. 9 is characterized by a peak 910 corresponding to a target located at a distance of about 6 cm and a peak 920 resulting from the transmitter-to-receiver leakage. Similar to the example from FIG. 3A, the contributions of the leakage are well-separated from those of the target. However, the use of MUSIC enables resolving of a much closer target in comparison to conventional DFT analysis. For example, referring back to the example in FIG. 3B, the same target located at a distance of 6 cm could not be resolved because its energy in the DFT-based spectrum overlaps with that of the leakage.

As explained above, one of the challenges to using MUSIC, and eigenspace analysis in general, is identifying which eigenvalues (and their corresponding eigenvectors) are associated with the signal subspace and which are associated with the noise subspace. In certain embodiments, the computational complexity of an eigenspace analysis is reduced by identifying a subset of eigenvectors as being associated with the signal subspace, using principal component analysis (PCA). For example, as shown in FIG. 10, in one embodiment, an iterative PCA algorithm is performed in which eigenvectors are estimated one at a time.

Figure 10:
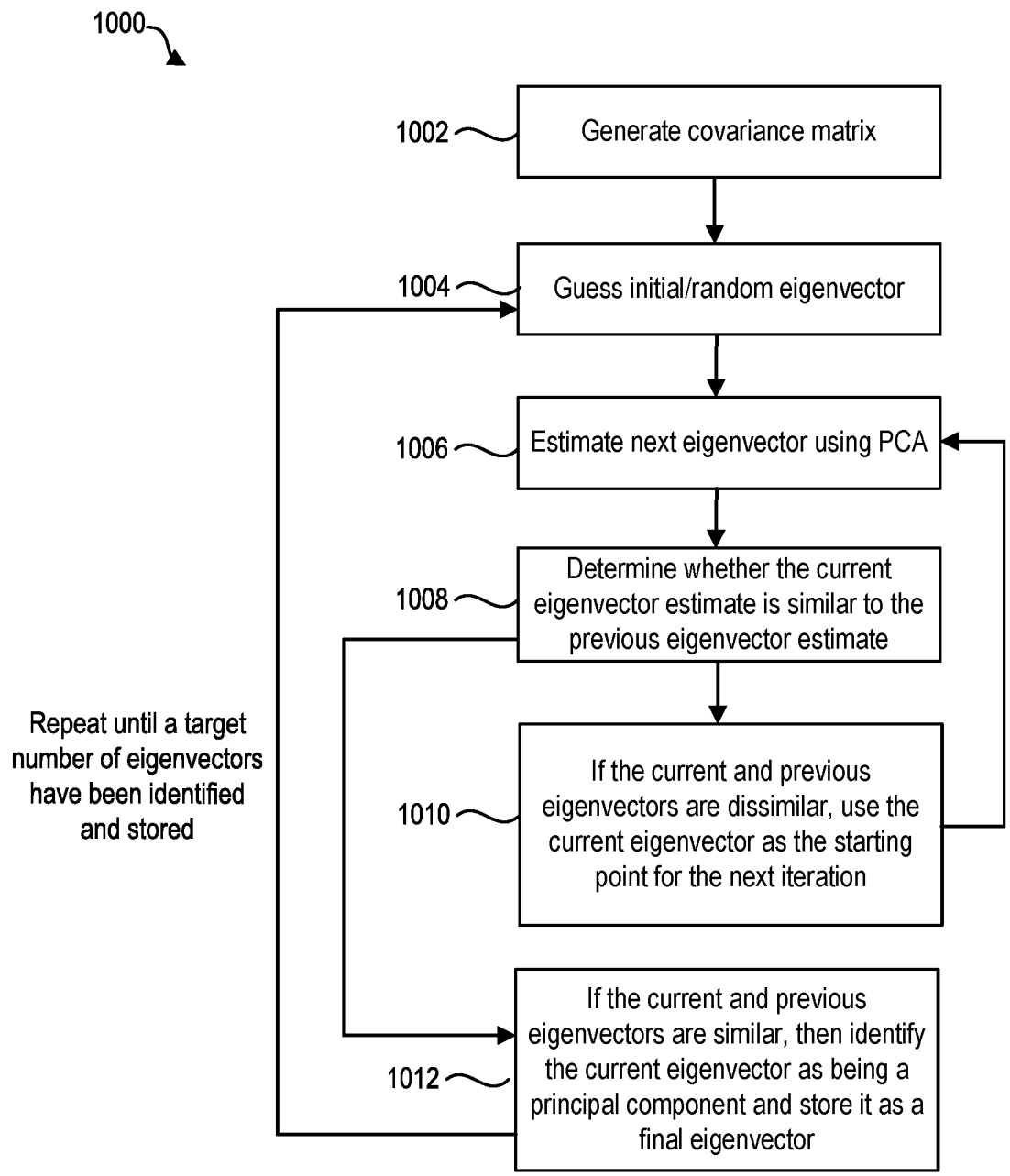
FIG. 10 illustrates an example process for estimating eigenvectors associated with a signal subspace, in accordance with certain embodiments.

FIG. 10 illustrates an example process 1000 for estimating eigenvectors associated with a signal subspace. The process 1000 efficiently computes a set of eigenvectors for a covariance matrix without having to resort to computing all the eigenvectors through eigen decomposition. In certain embodiments, the processing depicted in FIG. 10 can be performed by a signal processing subsystem of a radar system (e.g., signal processing subsystem 130 in FIG. 1). The process 1000 generates a set of p number of eigenvectors, where p can be set to a number corresponding to the maximum number of targets expected at any given point in time for the radar application. For example, in an automotive radar application, p could be set to between 3-5.

At 1002, a covariance matrix $R_{xx}$ is generated from received radar signals.

At 1004, an initial eigenvector $v_p(0)$ is guessed by choosing the elements (each value) of the initial eigenvector randomly. The initial eigenvector is a candidate eigenvector that will be iteratively refined until the eigenvector estimate converges to a particular eigenvector that will be stored as part of a set of final eigenvector estimates corresponding to p number of principal components.

At 1006, the next eigenvector estimate/candidate is generated by refining the current eigenvector estimate (e.g., the initial eigenvector from 1004) to compute a new eigenvector estimate that satisfies the eigenvector constraint $R_{xx}v=\alpha v$ for some scalar $\alpha$, and so that the current set of eigenvectors form an orthonormal basis. For example, the processing at 1006 may involve enforcing the eigenvector constraint by calculating $$v_p(k) \leftarrow R_{xx} \cdot v_p(k-1)$$

and then calculating $$v_p(k) \leftarrow v_p(k) - \Sigma_{j=1}^{p-1}(v_j^H \cdot v_p) \cdot v_j,$$

where H is the Hermitian transpose operation (i.e., taking the transpose of an eigenvector $v_j$ and then the complex conjugate of each element in the eigenvector $v_j$), to update eigenvector $v_p(k)$ so that it is orthogonal to the basis constructed up until this point, e.g., [v1, v2 ... $v_{p-1}$], where each eigenvector in the orthonormal basis is a final eigenvector that was converged to previously. Orthogonality is further ensured through Gram-Schmidt orthogonalization, by setting the norm of the estimated eigenvector to a value of 1 as follows:

$$v_p(k) \leftarrow \frac{v_p(k)}{\|v_p(k)\|}$$

At 1008, as part of refining the current eigenvector estimate, it is determined whether the current eigenvector estimate, i.e., the eigenvector $v_p(k)$ estimated in 1006, is similar to the eigenvector estimate $v_p(k-1)$ from the previous iteration. Similarity can be determined by calculating the norm of the difference between the eigenvectors (e.g., the L2 norm of $v_p(k)-v_p(k-1)$) and checking whether the norm is greater than a certain threshold. If the norm exceeds the threshold, then the eigenvectors are deemed to be dissimilar. Thus, the processing at 1008 may involve calculating a similarity metric (e.g., the L2 norm) whose value indicates a degree of similarity between a candidate eigenvector (e.g., the initial eigenvector from 1004) and the next candidate eigenvector (e.g., the current eigenvector estimate from 1006), and then determining whether the candidate eigenvector and the next candidate eigenvector are dissimilar based on comparing the value of the similarity metric to a threshold.

At 1010, if the current eigenvector estimate $v_p(k)$ and the previous eigenvector estimate $v_p(k-1)$ are dissimilar, then the current eigenvector estimate is used as the starting point for the next iteration and the process loops back to 1006 to continue refining the estimate to generate the next candidate. In this manner, a candidate eigenvector can be replaced with the next candidate eigenvector based on determining, according to the processing in 1008, that the candidate eigenvector and the next candidate eigenvector are dissimilar. Once the eigenvector estimates become similar, meaning the iterative estimation has converged to a particular eigenvector $v_p$, processing proceeds to 1012.

At 1012, the current eigenvector estimate is identified as being a principal component and stored as a final eigenvector. Thus, the current eigenvector estimate can be identified as being one of the final eigenvectors based on determining, according to the processing in 1008, that the candidate eigenvector and the next candidate eigenvector are similar. Processing loops back to 1004, with another random eigenvector being guessed, and continues until p number of final eigenvectors have been identified and stored.

FIG. 11 illustrates the applicability of MUSIC to the problem of estimating an angle of arrival. In general, a planar wave with a wavelength $\lambda$ impinging on an array of antenna elements will arrive at a different angle for each antenna element and can be expressed as a sinusoid with a phase rotation of angle $\phi_i$, where $$\phi_i = \frac{2\pi i \Delta \sin(\theta_i)}{\lambda}.$$

The phase rotation increases linearly across the antenna elements and is a function of the angle of arrival $\theta_i$. Since the phase rotation corresponds to the frequency of the sinusoid varying spatially across the antenna elements, estimating the frequency of the sinusoid (e.g., using MUSIC or DFT) is tantamount to estimating the angle of arrival. Eigenspace analysis would enable a greater degree of angular resolution compared to conventional DFT-based detection, allowing targets that are more closely spaced (less angular separation) to be distinguished from one another.

As shown in FIG. 11, if the received signals are from two targets, then each target is represented as a separate sinusoid whose frequency can be estimated. If the frequency is estimated through eigenspace analysis, then there should be two eigenvectors whose eigenvalues are the largest among the eigenvectors for the covariance matrix generated using the signals received by the antenna elements.

Figure 12:
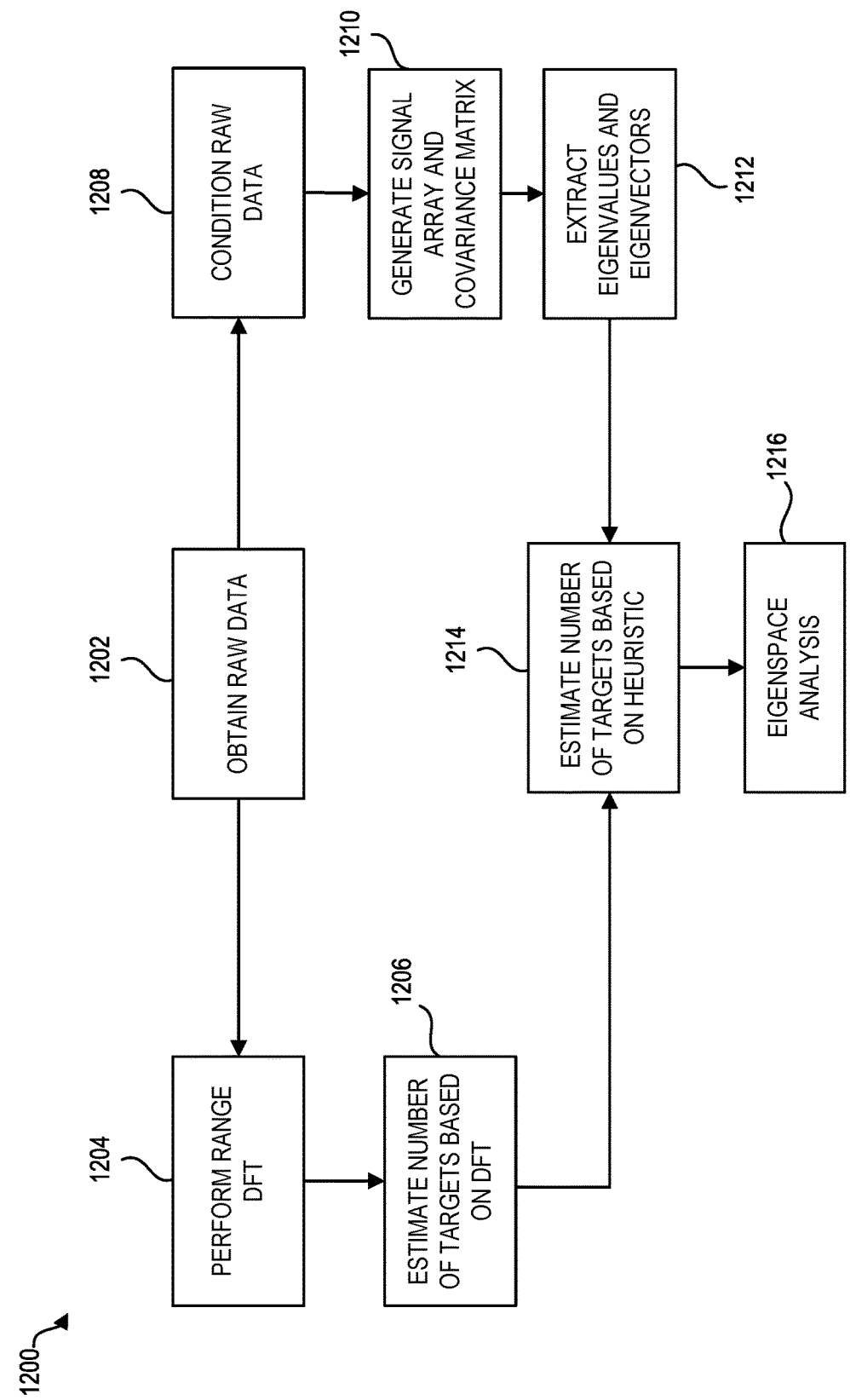
FIG. 12 illustrates a process for improving the accuracy of an eigenspace analysis based on estimating the total number of targets, in accordance with certain embodiments.

FIG. 12 illustrates a process 1200 for improving the accuracy of an eigenspace analysis based on estimating the total number of targets. In the embodiment depicted in FIG. 12, the process 1200 includes using a DFT to estimate the number of targets in the field of view. However, other techniques that can estimate the number of targets based on spectral analysis can also be used. In certain embodiments, such as the embodiment of FIG. 1, the processing in FIG. 12 can be performed by a signal processing subsystem, e.g., as part of the signal analysis performed by signal processing subsystem 130.

At 1202, raw data corresponding to received radar signals is obtained. The raw data can be obtained through processing the received radar signals received at one or more antenna elements through an ADC (e.g., ADC 132) and sampling the digitized versions of the radar signals.

At 1204, a DFT is applied to the raw data obtained in 1202 to generate a DFT spectrum. The processing in 1204 generates a one-dimensional array of bins in the range domain (e.g., bins arranged according to delay or range index). The amplitudes of the bins can be mapped onto a DFT spectrum representing the amplitude as a function of distance (e.g., similar to the plot in FIG. 3A). In the embodiment depicted in FIG. 12, the DFT is used to estimate the range of one or more targets represented in the raw data. The range information estimated by the DFT can be used as a supplement to range information estimated based on eigenspace analysis, or discarded since the eigenspace analysis would provide more accurate range information. Other spectral analysis techniques can be used as an alternative to the range DFT in 1204 to generate a set of bins. For example, the processing in 1204 may involve a DFT performed for purposes of estimating a different attribute of a target, such as angle of arrival, or the processing in 1204 could be performed using constant false alarm rate (CFAR) detection.

At 1206, an estimate of the total number of targets in the field of view is generated based on the result of the DFT performed in 1204. The number of targets can be estimated, for example, to be equal to the number of peaks in the DFT spectrum.

At 1208, the raw data obtained in 1202 is conditioned to prepare the raw data for eigenspace processing. Step 1208 can be performed in parallel with the processing in step 1204. The conditioning of the raw data includes converting the raw data into a set of signal vectors representing the received radar signals, e.g., a separate signal vector for the signals received by each individual antenna element.

At 1210, a signal array is generated using the conditioned raw data. For example, the signal array can be a 2D array formed by combining the signal vectors generated in 1208. The signal array represents the signals received from each antenna element and also represents Gaussian noise that may be present in the received signals. Additionally, at 1210, a covariance matrix is generated using the signal array. The covariance matrix can be generated by performing statistical correlation on the vectors of the signal array to compute covariance values.

At 1212, eigenvalues and their corresponding eigenvectors are extracted from the covariance array generated in 1210. In certain embodiments, the eigenvectors and eigenvalues are extracted through conventional eigen decomposition. However, in other embodiments, eigenvectors and their corresponding eigenvalues can be extracted in a more computationally efficient manner using PCA, for example, an iterative PCA algorithm that converges to a set of eigenvectors associated with a signal subspace, as discussed above in connection with FIG. 10.

At 1214 an estimate of the total number of targets generated at 1206 is refined based on one or more heuristics such as an Akaike information criterion (AIC). For example, a heuristic algorithm can be applied to the distribution of the eigenvalues extracted in 1212 to identify the number of targets based on a threshold value and/or based on the shape of the distribution. As explained earlier in connection with FIGS. 7 and 8, identifying the eigenvalues associated with the signal subspace using an eigenvalue distribution can be difficult. Here, the estimate generated in 1206 can be used as an input to the heuristic algorithm, for example, to check whether the estimate generated based on the one or more heuristics is plausible, or to constrain the estimate generated based on the one or more heuristics so that the estimate generated in 1214 is within a certain range of the estimate generated in 1206. The processing in 1214 is optional; in certain embodiments, the estimate generated in 1206 is used as a final estimate of the number of targets.

At 1216, the final estimate of the number of targets (e.g., the estimate that was generated in 1214 taking into consideration the estimate from 1206) is input to an eigenspace analysis. For example, the total number of targets indicated in the final estimate could be used to select the corresponding number of largest eigenvectors (one eigenvector per target) for use in constructing the signal subspace, or to select the remaining, smaller eigenvectors for use in constructing the noise subspace. Once the signal subspace or noise subspace has been constructed, a pseudo spectrum can be generated by projection onto the subspace, as described earlier. In this manner, the estimate generated in 1206 can be applied to improve the accuracy of the resulting pseudo spectrum. The attributes of the targets (e.g., range, azimuth, elevation, or any combination thereof) can then be estimated using the pseudo spectrum.

Figure 13:
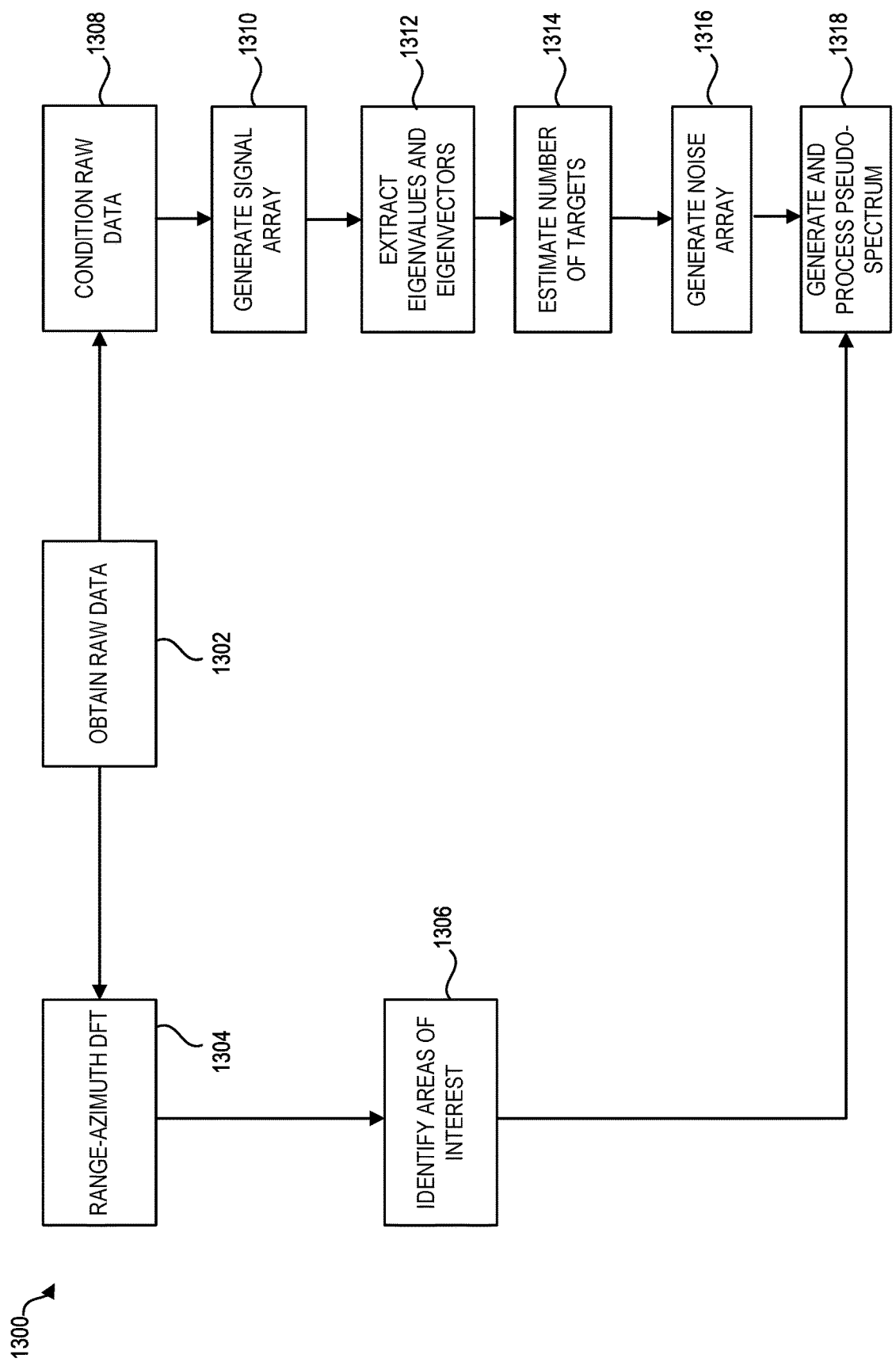
FIG. 13 illustrates a process for simplifying an eigenspace analysis based on identifying areas of interest, in accordance with certain embodiments.

FIG. 13 illustrates a process 1300 for simplifying an eigenspace analysis based on identifying areas of interest. In certain embodiments, such as the embodiment of FIG. 1, the processing in FIG. 13 can be performed by a signal processing subsystem, e.g., as part of the signal analysis performed by signal processing subsystem 130.

At 1302, raw data corresponding to received radar signals is obtained. The processing in 1302 is analogous to the processing in 1202 of FIG. 12 and can be performed in the same manner.

At 1304, a DFT (or some other type of spectral analysis) is performed on the raw data to estimate the range and azimuth of targets in the field of view. The processing in 1304 produces a two-dimensional (2D) array of bins in the range and azimuth domains. Each bin in the two-dimensional array represents a particular combination of a distance and an angle. Other types of 2D DFTs can also be applied to identify areas of interest, for example, a DFT performed to estimate range and elevation.

At 1306, areas of interest are identified from the results of the DFT performed in 1304. In particular, the bins which are of sufficiently high value (e.g., above a certain threshold) can be identified as being areas of interest, i.e., areas where there are potential targets. The areas of interest can be expressed as distance ranges and angular ranges.

At 1308, the raw data obtained in 1302 is conditioned to prepare the raw data for eigenspace processing. Step 1308 can be performed in parallel with the processing in step 1304 and can be performed in the same manner as the processing in 1208 of FIG. 12.

At 1310, a signal array is generated using the conditioned raw data, and a covariance matrix is generated using the signal array. Step 1310 is analogous to the processing in step 1210 of FIG. 12 and can be performed in the same manner.

At 1312, eigenvalues and their corresponding eigenvectors are extracted from the covariance array generated in 1310. Step 1312 is analogous to the processing in step 1212 of FIG. 12 and can be performed in the same manner.

At 1314, the total number of targets in the field of view is estimated. Step 1314 is analogous to step 1214 of FIG. 12 and can be performed in a similar manner (e.g., using a heuristic algorithm applied to the distribution of the eigenvalues generated in 1312), except that in the embodiment of FIG. 13, there is no additional estimate of the number of targets being input in order to generate a final estimate of the number of targets.

At 1316, a noise array is generated by combining the eigenvectors associated with the noise subspace. As explained earlier, the eigenvectors associated with the noise subspace are the ones whose corresponding eigenvalues are the smallest. Thus, the noise array can be generated using the eigenvectors that remain after a number of eigenvectors associated with the largest eigenvalues (equal to the number of targets estimated in 1314) are eliminated from consideration.

At 1318, a pseudo spectrum is generated using the noise array and processed to estimate attributes of one or more targets (e.g., range, azimuth, elevation, or any combination thereof). The generating and processing of the pseudo spectrum in 1318 may involve processing similar to that of the eigenspace analysis in 1216 of FIG. 12, for example, projection onto the noise subspace represented by the noise array to generate a pseudo spectrum and identification of peaks in the pseudo spectrum to determine the values of the parameters associated with such peaks. However, the pseudo spectrum can be generated in a more efficient manner by considering only the areas of interest identified in 1306. For instance, in 1318, instead of searching through all possible steering vectors to find those that are orthogonal to the noise subspace, only those steering vectors that correspond to the areas of interest (e.g., steering vectors corresponding to distances and/or angles identified as being of interest) can be projected onto the noise subspace in order to generate the pseudo spectrum. This results in a significant reduction in the number of matrix multiplications that need to be performed since the physical space in a radar field of view is typically mostly empty, with relatively few objects being present at any given point in time. Additionally, although the DFT performed in 1304 can be used to estimate the same attributes (e.g., range and azimuth), the pseudo spectrum generated in 1318 permits the attributes to be estimated with much greater accuracy.

Figure 14:
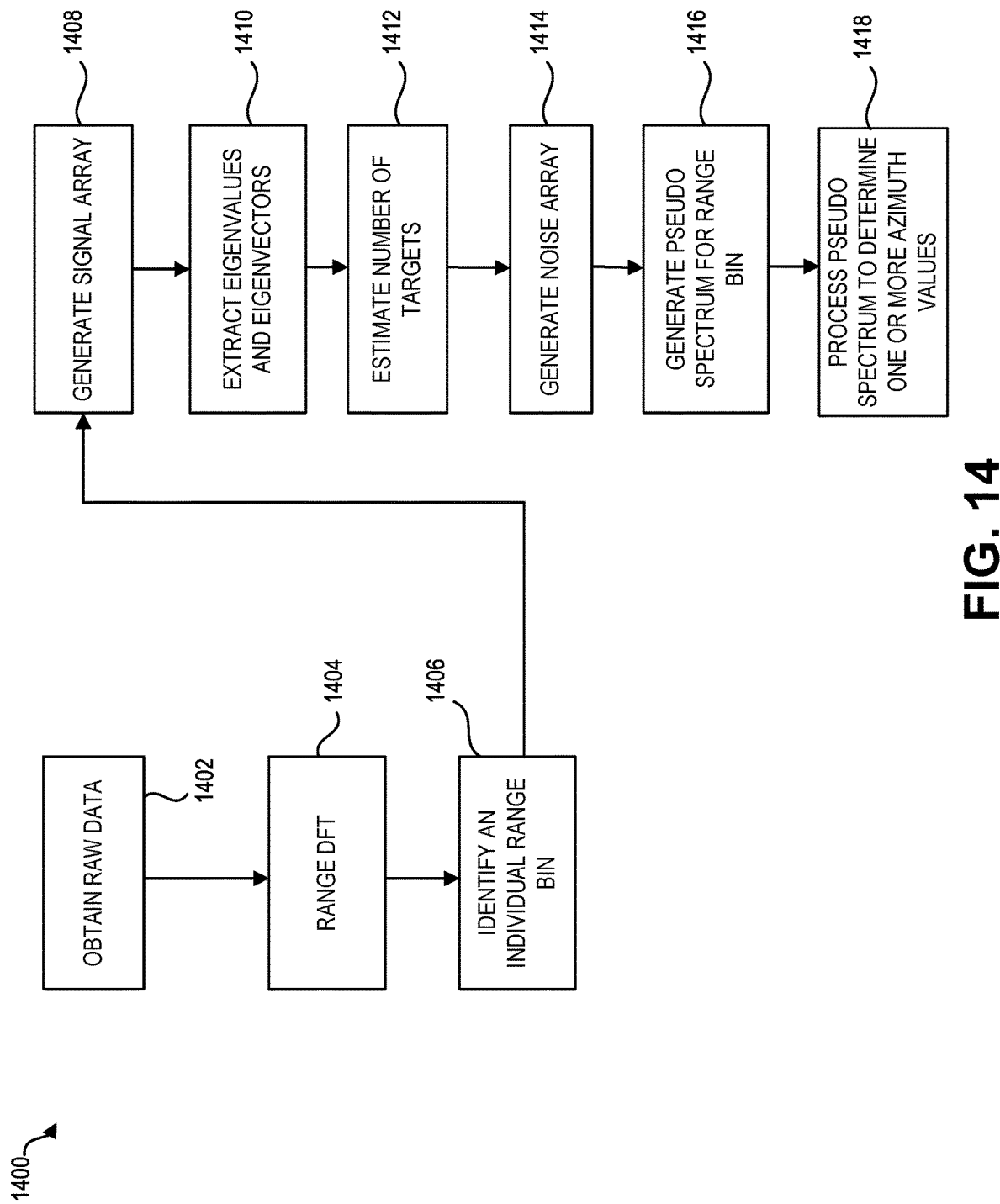
FIG. 14 illustrates a process for simplifying an eigenspace analysis based on identifying individual range bins using a DFT, in accordance with certain embodiments.

FIG. 14 illustrates a process 1400 for simplifying an eigenspace analysis based on identifying individual range bins using a DFT. In certain embodiments, such as the embodiment of FIG. 1, the processing in FIG. 14 can be performed by a signal processing subsystem, e.g., as part of the signal analysis performed by signal processing subsystem 130.

At 1402, raw data corresponding to received radar signals is obtained. The processing in 1402 is analogous to the processing in 1202 of FIG. 12 and can be performed in the same manner.

At 1404, a DFT is performed on the raw data to estimate the range of targets in the field of view. In some embodiments, another type of spectral analysis may be performed on the raw data to estimate the range of targets in the field of view as an alternative to using a DFT. The processing in 1404 can be performed in the same manner as the processing in 1204 of FIG. 12. As discussed above in connection with the embodiment of FIG. 12, the range estimates generated using the DFT are not necessarily relied upon as final estimates for target distances. However, in the embodiment of FIG. 14, the range estimates generated using the DFT in 1404 are used as final estimates since DFT-based detection generally provides adequate range resolution (accuracy in the time domain), except in certain situations such as the near field scenario described earlier, where transmitter-to-receiver leakage can adversely affect the results of the DFT. Here, relying upon the DFT-based range estimates can simplify eigenspace analysis by omitting range estimation from the eigenspace analysis. This reduces the dimensionality of the steering array used for generating the pseudo spectrum in step 1416 below, enabling the eigenspace analysis to be performed much faster than if the eigenspace analysis were applied to estimate both range and some other attributes such as azimuth.

At 1406, an individual range bin is identified as being associated with one or more targets. The range bin can be identified as being a bin whose value is highest among all the bins. In certain embodiments, the range bin can be identified as being a bin whose value exceeds a threshold.

At 1408, a signal array is generated using the raw data obtained in 1402, but only for the range bin identified in 1406. Thus, the signal array generated in 1408 represents a portion of a complete signal array, the portion comprising signal vectors corresponding to the identified range bin. This limits the size of the signal array for purposes of extracting eigenvalues and eigenvectors in 1410, reducing the amount of calculations needed for extraction.

At 1410, eigenvalues and eigenvectors are extracted, e.g., through eigen decomposition applied to the signal array generated in 1408.

At 1412, the total number of targets in the field of view is estimated. The processing in 1412 can be performed in the same manner as in 1314 of FIG. 13.

At 1414, a noise array is generated from the eigenvectors associated with the noise subspace. The processing in 1414 can be performed in the same manner as in 1316 of FIG. 13.

At 1416, a pseudo spectrum is generated for the range bin identified in 1406, e.g., based on projecting onto the noise subspace represented by the noise array that was generated in 1414.

At 1418, the pseudo spectrum generated in 1416 is processed to determine one or more azimuth values for the range bin identified in 1406. The azimuth values can be determined as angles corresponding to locations of peaks in the pseudo spectrum. When combined with the range estimate corresponding to the range bin identified in 1406, this produces one or more range-azimuth value pairs, each value pair representing the distance and angle of arrival of a target in the field of view. The processing in 1406 to 1418 can be repeated to identify multiple range bins (e.g., the next highest value bin). The range-azimuth value pairs determined across multiple range bins can be combined to generate a range-azimuth plot (e.g., a graphical plot or numerical representation thereof) indicating the distance and angle of arrival of every target in the field of view.

Figure 15:
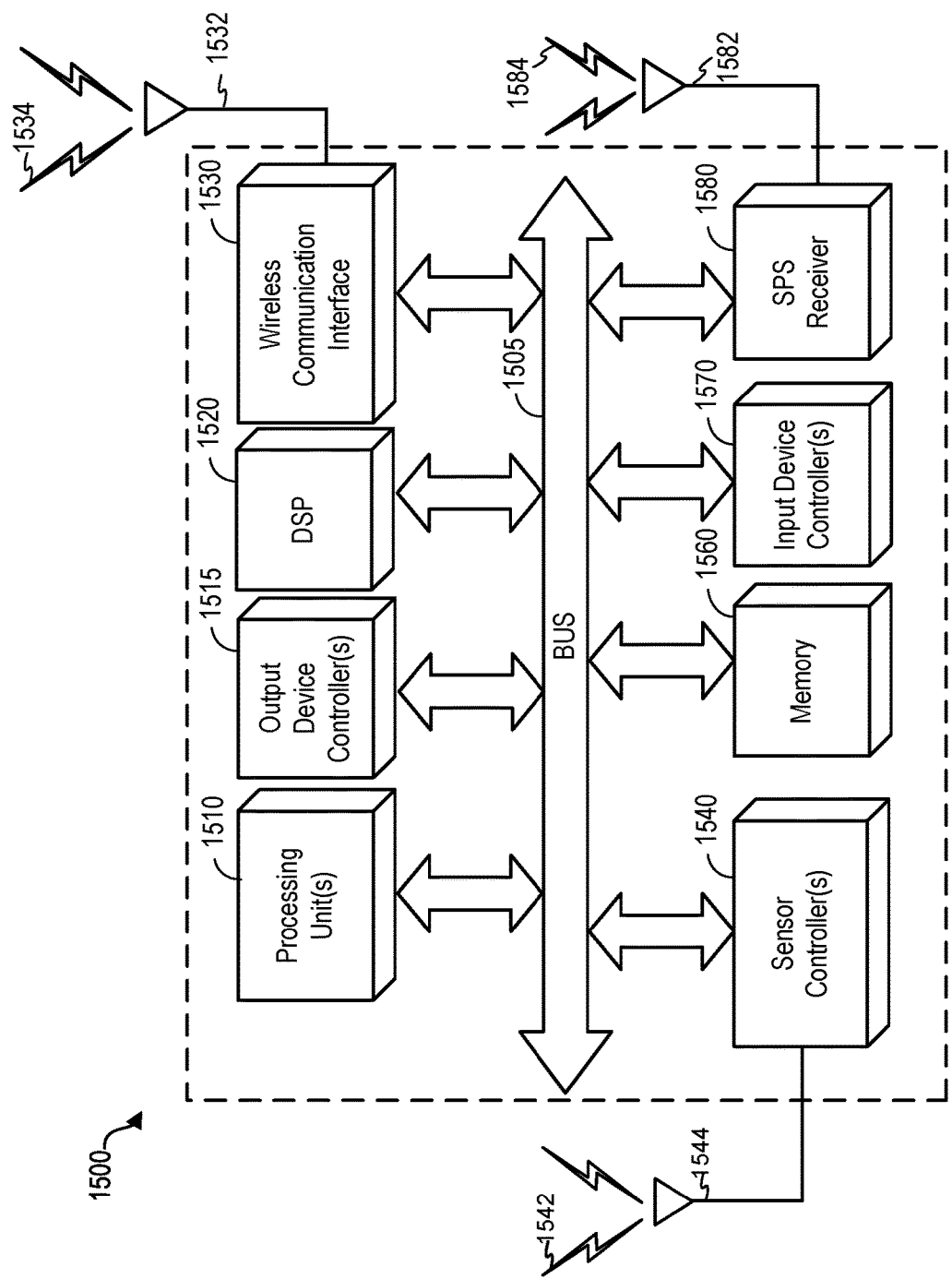
FIG. 15 is a block diagram of an example electronic device that may incorporate embodiments of the present disclosure.

FIG. 15 is a block diagram of internal components of an example of an electronic device 1500 that may incorporate embodiments of the present disclosure. For instance, device 1500 may represent a system on a chip (SOC) with additional systems including sensor systems (e.g., a radar system), all integrated on a monolithic integrated circuit, or chip. It should be noted that FIG. 15 is meant only to provide a generalized illustration of various components, any or all of which may be utilized as appropriate. It can be noted that, in some instances, components illustrated by FIG. 15 can be localized to a single physical device and/or distributed among various networked devices, which may be disposed at different physical locations.

The device 1500 is shown comprising hardware elements that can be electrically coupled via a bus 1505 (or may otherwise be in communication, as appropriate). The hardware elements may include a processing unit(s) 1510 which can include without limitation one or more general-purpose processors, one or more special-purpose processors (such as digital signal processing (DSP) chips, graphics acceleration processors, application specific integrated circuits (ASICs), and/or the like), and/or other processing structure or means. Some embodiments may have a separate DSP 1520, depending on desired functionality. Processing unit(s) 1510 may include a processor capable of performing digital signal processing for a radar system as discussed herein. In certain embodiments, processing unit(s) 1510 include one or more processors that implement the signal processing subsystem depicted in FIG. 1.

The device 1500 also can include one or more input device controllers 1570, which can control without limitation an in-vehicle touch screen, a touch pad, microphone, button(s), dial(s), switch(es), and/or the like; and one or more output device controllers 1515, which can control without limitation a display, light emitting diode (LED), speakers, and/or the like.

The device 1500 may also include a wireless communication interface 1530, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication interface 1530 may permit data to be exchanged with a network, wireless access points, other computer systems, and/or any other electronic devices described herein. The communication can be carried out via one or more wireless communication antenna(s) 1532 that send and/or receive wireless signals 1534.

Depending on desired functionality, the wireless communication interface 1530 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RATs. An OFDMA network may employ LTE, LTE Advanced, and so on, including 4G and 5G technologies.

The device 1500 can further include sensor controller(s) 1540. Such controllers can incorporate and/or control, without limitation, one or more radar systems, one or more accelerometer(s), gyroscope(s), camera(s), magnetometer(s), altimeter(s), microphone(s), proximity sensor(s), light sensor(s), and the like. Specifically, sensor controllers 1540 may send and/or receive sensor signals 1542, such as radar transmit (Tx) signals and radar receive (Rx) signals, using one or more antennas 1544. Examples of antennas 1544 may be Tx antenna 112 and Rx antenna 114 shown in FIG. 1. Sensor controllers 1540 may also include various components of a radar system, such as one or more instances of a signal generator (e.g., VCO 110 in combination with mixer 120), and receiver components (e.g., mixer 122 and ADC 132).

Embodiments of the device 1500 may also include a Satellite Positioning System (SPS) receiver 1580 capable of receiving signals 1584 from one or more SPS satellites using an SPS antenna 1582. The SPS receiver 1580 can extract a position of the device, using conventional techniques, from satellites of an SPS system, such as a global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 1580 can be used with various augmentation systems (e.g., a Satellite Based Augmentation System (SBAS)) that may be associated with or otherwise enabled for use with one or more global and/or regional navigation satellite systems. By way of example, but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The device 1500 may further include and/or be in communication with a memory 1560. The memory 1560 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1560 of the device 1500 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods.

FIGS. 16-18, 19A and 19B are flow diagrams illustrating methods according to various embodiments. Although FIGS. 16-18, 19A and 19B show various blocks arranged in sequence, alternative embodiments may vary in the way that the functionality provided by the blocks illustrated in FIGS. 16-18, 19A and 19B is provided, for example, by adding, omitting, combining, separating, reordering, and otherwise varying the functionality illustrated in the blocks. In certain embodiments, such as the embodiment of FIG. 1, the functionality described with respect to the blocks in FIGS. 16-18, 19A and 19B may be performed by a radar system such as the radar system 100. Where the functionality involves data processing, the data processing can be performed by a signal processing subsystem of a radar system (e.g., the signal processing subsystem 130). Further, in certain embodiments, data processing may be performed, at least in part, by a separate computer system coupled to a radar system. Means for performing the functionality illustrated in FIGS. 16-18, 19A and 19B may include hardware and/or software means including, for example, means for generating a radar signal for transmission by one or more transmit antennas (e.g., signal generator 101), means for conditioning or performing preliminary processing on received radar signals for further processing or analysis (e.g., mixer 122 and ADC 132), and means for detecting or determining attributes of targets based on received radar signals (e.g., signal processing subsystem 130).

Figure 16:
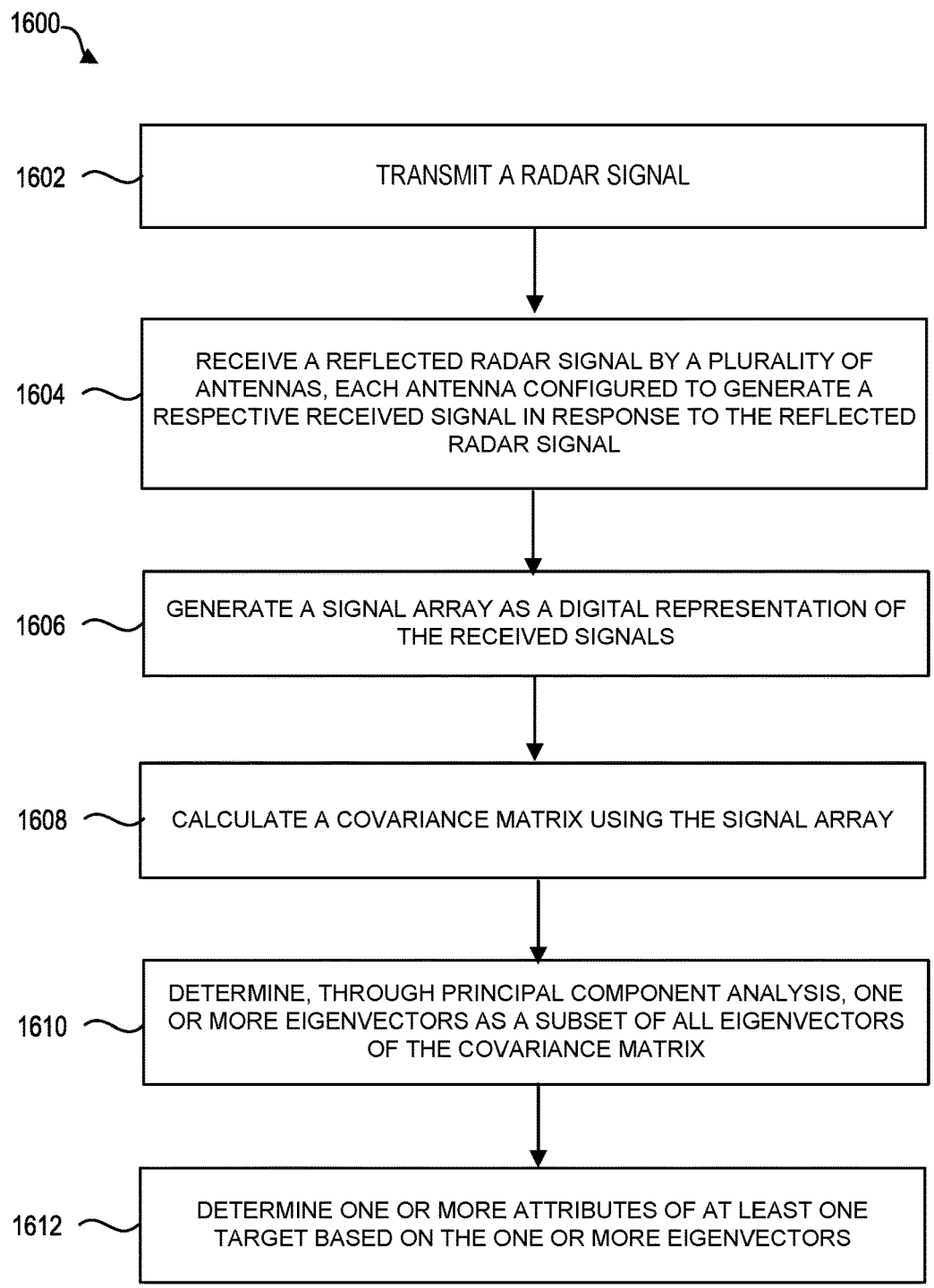
FIG. 16 is a flow diagram illustrating a method of determining one or more attributes of a target, according to certain embodiments.

FIG. 16 is a flow diagram illustrating a method 1600 of determining one or more attributes of a target, according to certain embodiments. At 1602, a radar signal is transmitted (e.g., by one or more transmit antennas of a radar system). As described above, radar signals can be transmitted in an omnidirectional or directional fashion. When transmitted by multiple antennas (e.g., a transmit antenna array), the radar signal in 1602 may be a result of signals from multiple transmit antennas combining in a coherent manner through constructive and/or destructive interference. The radar signal in 1602 can be transmitted into an environment within a field of view of a radar system.

At 1604, a reflected radar signal is received by a plurality of antennas (e.g., a receive antenna array). The reflected radar signal may correspond to the radar signal in 1602 arriving at the plurality of antennas after reflecting off one or more targets in the environment. Each of the antennas in the plurality of antennas may be configured to generate a respective received signal in response to the reflected radar signal. Each received signal depends on the direction of a target relative to the antenna, the distance of the target, the speed of the target, and/or other attributes of the target. If there are multiple targets in the environment (e.g., two or more targets that are within the field of view), each target may contribute to a received signal such that the received signal includes information about the multiple targets.

At 1606, a signal array is generated as a digital representation of the received signals. The signal array can be generated, for example, by converting the received signals from the plurality of antennas into corresponding digital signals using one or more ADCs, sampling the received signals in the analog or digital domain, and combining values of the digital signals into a two-dimensional array, where each column of the signal array represents digital signal values corresponding to received signals from the plurality of antennas at a particular point in time.

At 1608, a covariance matrix is calculated using the signal array. The covariance matrix can be a two-dimensional matrix of values representing the covariance between different pairs of values in the signal array.

At 1610, one or more eigenvectors are determined through principal component analysis (PCA). The one or more eigenvectors can form a subset of all the eigenvectors of the covariance matrix. Determining only a subset of all possible eigenvectors results in a substantial reduction in computation operations compared to determining all of the eigenvectors. In certain embodiments, the determining of the one or more eigenvectors in 1610 is performed using an iterative PCA algorithm such as that described above in connection with FIG. 10.

At 1612, one or more attributes of at least one target are determined based on the one or more eigenvectors determined in 1610. The determining of the one or more attributes may involve DFT based processing and/or MUSIC based processing to determine how many targets are in the field of view, the distance of a target, the speed a target, the direction of a target (e.g., azimuth and/or elevation), and/or other target attributes.

Figure 17:
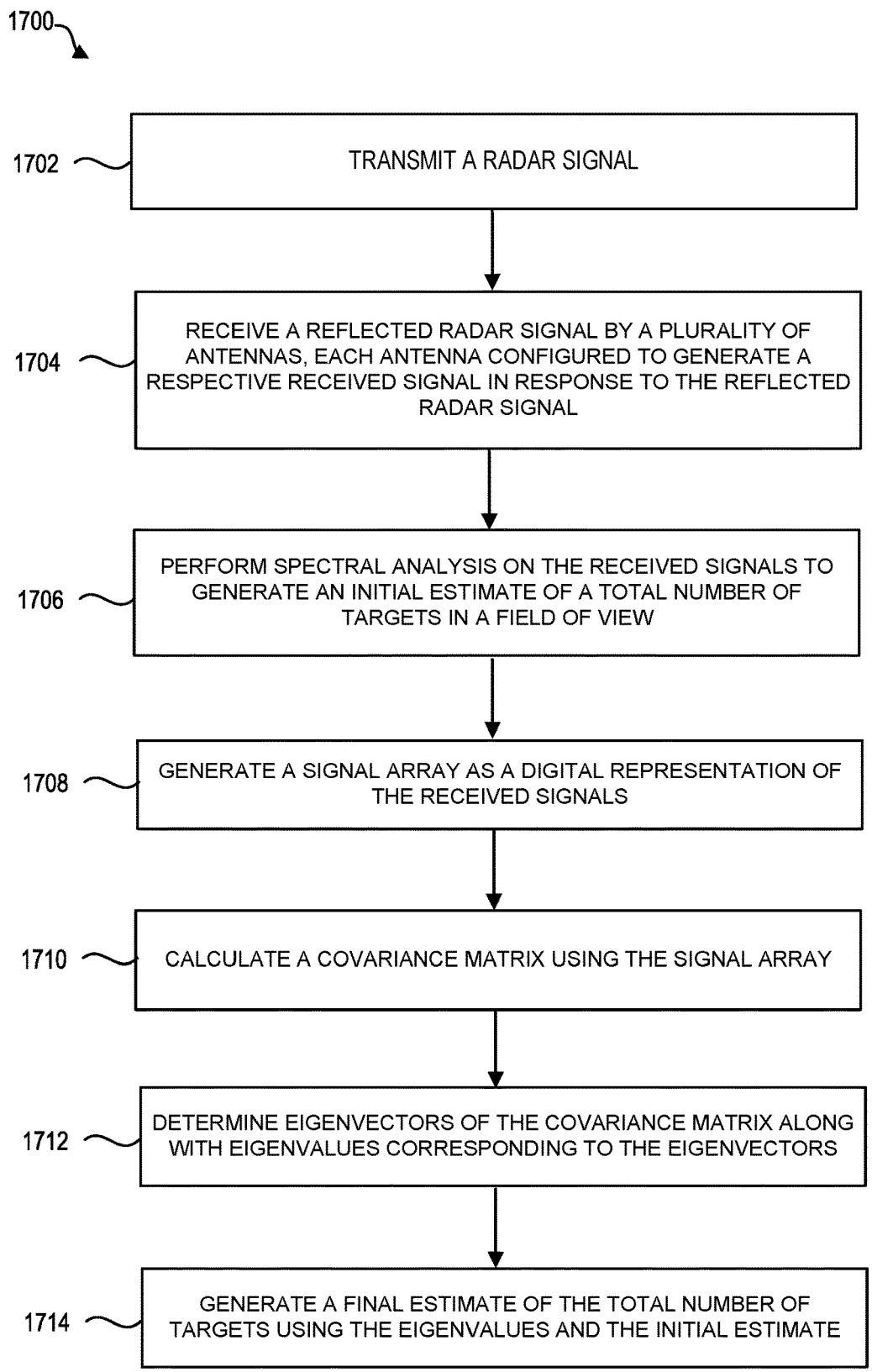
FIG. 17 is a flow diagram illustrating a method of estimating the total number of targets in a field of view, according to certain embodiments.

FIG. 17 is a flow diagram illustrating a method 1700 of estimating the total number of targets in a field of view, according to certain embodiments. At 1702, a radar signal is transmitted. At 1704, a reflected radar signal is received by a plurality of antennas to generate a respective received signal at each antenna. Blocks 1702 and 1704 correspond to blocks 1602 and 1604 in FIG. 16, respectively, and can be implemented in the same manner.

At 1706, spectral analysis is performed on the received signals to generate an initial estimate of a total number of targets in the field of view. In certain embodiments, the spectral analysis in 1706 may involve a DFT (e.g., a range DFT as described above in connection with blocks 1204 and 1206 of FIG. 12).

At 1708, a signal array is generated as a digital representation of the received signals. Block 1708 corresponds to block 1606 of FIG. 16 and can be implemented in the same manner.

At 1710, a covariance matrix is calculated using the signal array from block 1708. Block 1710 corresponds to block 1608 of FIG. 16 and can be implemented in the same manner.

At 1712, eigenvectors of the covariance matrix from block 1710 are determined along with eigenvalues corresponding to the eigenvectors. As indicated above, each eigenvector has a corresponding eigenvalue and values of both may be computed through eigen decomposition.

At 1714, a final estimate of the total number of targets in the field of view is generated using the eigenvalues from block 1712 and the initial estimate from block 1706. In certain embodiments, the final estimate in block 1714 is generated based on applying one or more heuristics, for example, as described above in connection with block 1214 of FIG. 12. Further, as indicated above, the initial estimate can to be used to check whether the estimate generated based on the one or more heuristics is plausible or to constrain the estimate generated based on the one or more heuristics.

Figure 18:
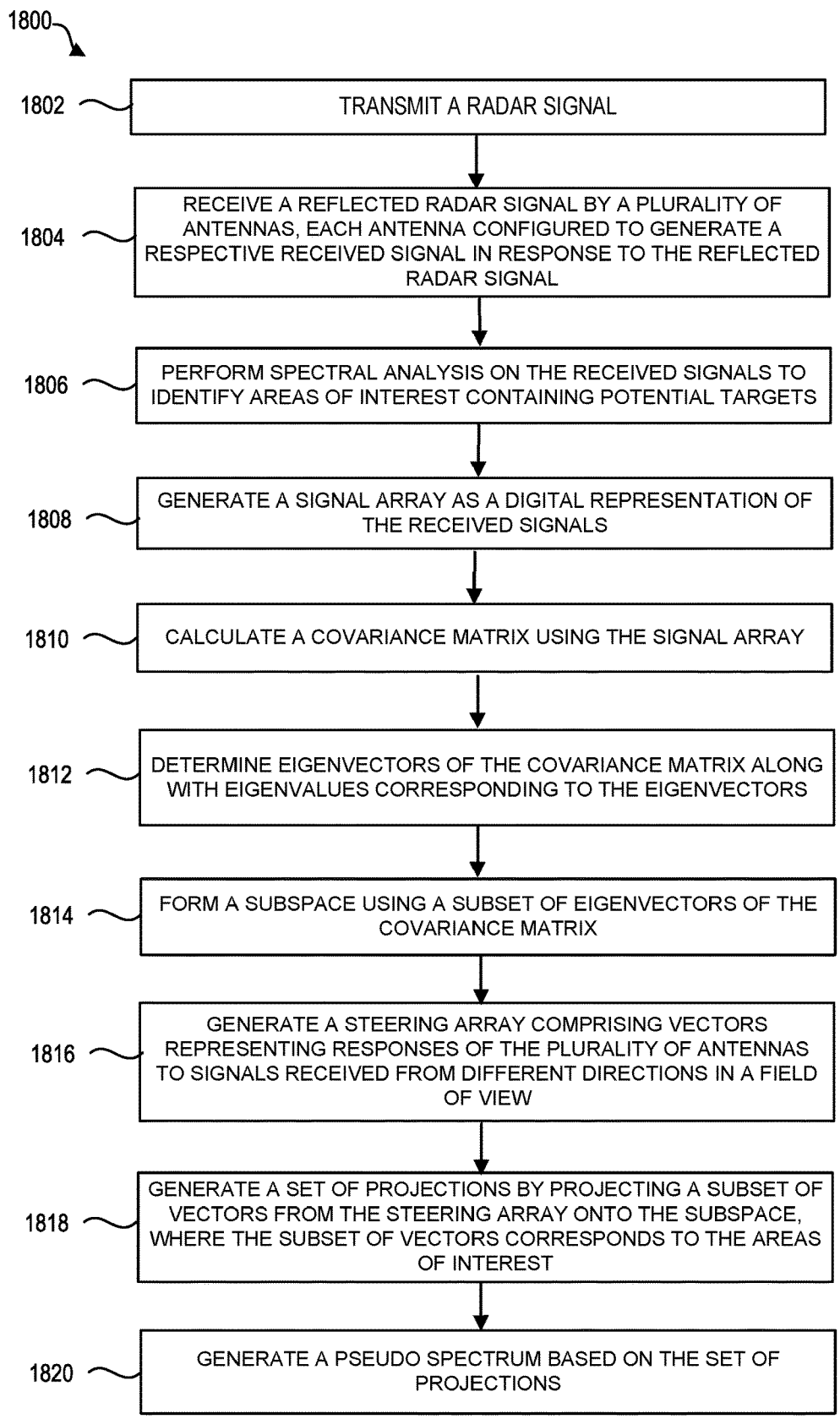
FIG. 18 is a flow diagram illustrating a method of generating a pseudo spectrum based on identifying areas of interest, according to certain embodiments.

FIG. 18 is a flow diagram illustrating a method 1800 of generating a pseudo spectrum based on identifying areas of interest, according to certain embodiments. At 1802, a radar signal is transmitted. At 1804, a reflected radar signal is received using a plurality of antennas to generate a respective received signal at each antenna. Blocks 1802 and 1804 correspond to blocks 1602 and 1604 in FIG. 16, respectively, and can be implemented in the same manner.

At 1806, spectral analysis is performed on the received signals to identify areas of interest containing potential targets. In certain embodiments, the spectral analysis in 1806 may involve a DFT (e.g., a range-azimuth DFT as described above in connection with blocks 1304 and 1306 of FIG. 13).

At 1808, a signal array is generated as a digital representation of the received signals. Block 1808 corresponds to block 1606 of FIG. 16 and can be implemented in the same manner.

At 1810, a covariance matrix is calculated using the signal array from block 1808. Block 1810 corresponds to block 1608 of FIG. 16 and can be implemented in the same manner.

At 1812, eigenvectors of the covariance matrix from block 1810 are determined along with eigenvalues corresponding to the eigenvectors. Block 1812 corresponds to block 1712 of FIG. 17 and can be implemented in the same manner.

At 1814, a subspace is formed using a subset of the eigenvectors from block 1812. The subspace in block 1814 can be a signal subspace (contributions of targets to received signals) or a noise subspace (representing Gaussian noise). For example, as discussed above in connection with block 1316 of FIG. 13, a noise subspace can be represented as a noise array formed by combining eigenvectors that are associated with the noise subspace.

At 1816, a steering array is generated. The steering array includes vectors representing responses of the plurality of antennas to signals received from different directions in a field of view. In particular, the steering array models how the antennas respond to incident signals from targets (e.g., the reflected radar signal from block 1804). The steering array can be generated based on knowledge about how the antennas have been configured. For example, assuming that each antenna in the plurality of antennas is spaced apart from any adjacent antenna by a distance d, an incident signal arriving at the antenna array at an angle θ could arrive first at one of the antennas, and each subsequent antenna could receive the same signal delayed by a certain factor such that the delay Δi at the i-th antenna is equal to $$\frac{(i-1)d \sin \theta}{c},$$

where c is the speed of light. Accordingly, a vector in the steering array could be expressed as a function of θ and the angular frequency ω of the incident signal, as follows:

$$\begin{bmatrix} 1 \\ e^{-j\omega \frac{d \sin \theta}{c}} \\ e^{-j\omega \frac{2d \sin \theta}{c}} \\ \vdots \\ e^{-j\omega \frac{(N-1)d \sin \theta}{c}} \end{bmatrix}$$

At 1818, a set of projections is generated by projecting a subset of vectors from the steering array onto the subspace formed in block 1814. In particular, the subset of vectors in block 1818 corresponds to the areas of interest identified in block 1806. As discussed above in connection with block 1318 of FIG. 13, projecting only those steering vectors that correspond to the areas of interest (e.g., steering vectors corresponding to distances and/or angles identified as being of interest) avoids having to search through all possible steering vectors (e.g., to find those that are orthogonal to a noise subspace).

At 1820, a pseudo spectrum is generated based on the set of projections from block 1818. The values of the pseudo spectrum in 1820 may be computed as a function of the energy of the projections, for example, based on the norm of each projection, as discussed above in connection with FIG. 4.

Figure 19A:
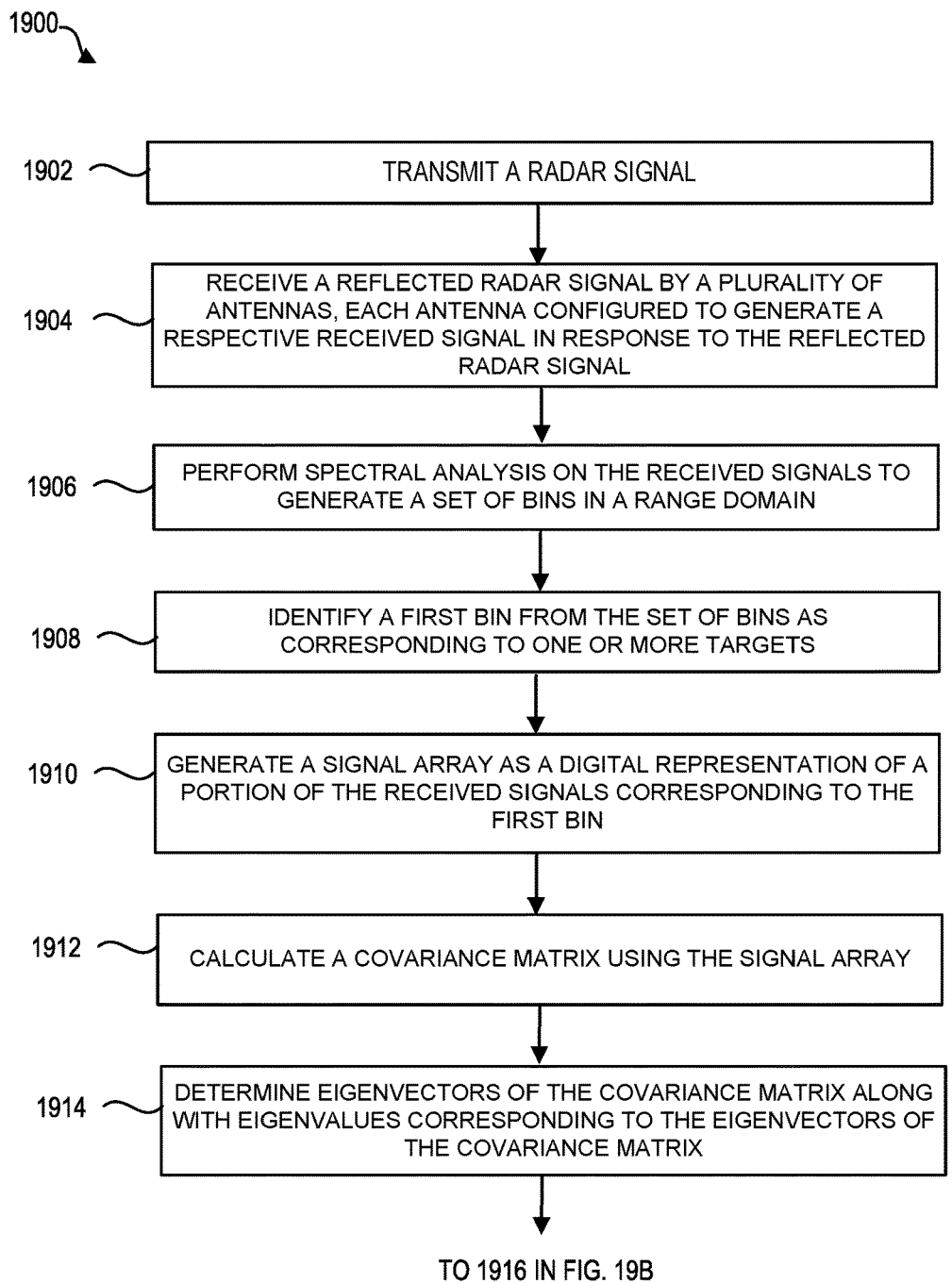
FIGS. 19A and 19B are flow diagrams illustrating a method of determining a direction of arrival of a target, according to certain embodiments.
Figure 19B:
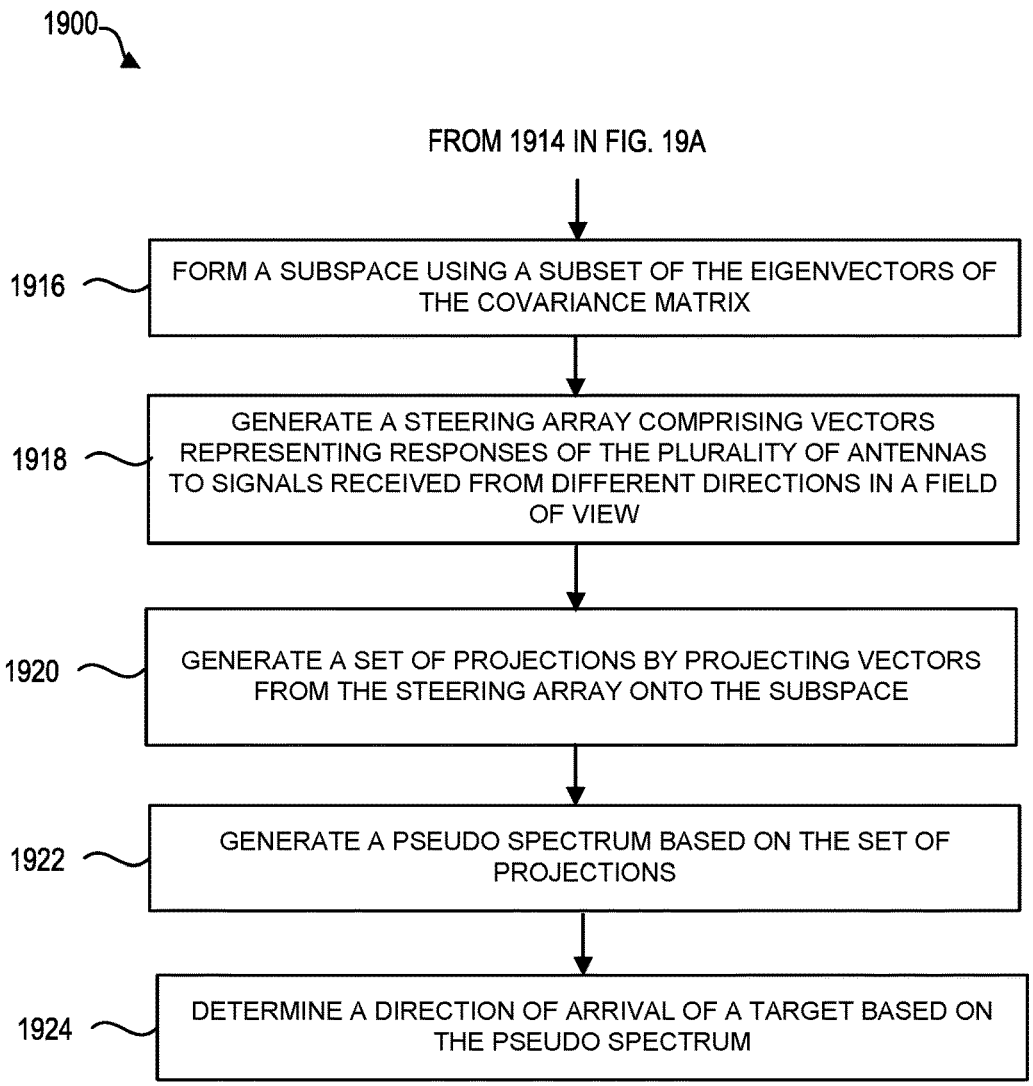

FIGS. 19A and 19B are flow diagrams illustrating a method 1900 of determining a direction of arrival of a target, according to certain embodiments. At 1902, a radar signal is transmitted. At 1904, a reflected radar signal is received using a plurality of antennas to generate a respective received signal at each antenna. Blocks 1902 and 1904 correspond to blocks 1602 and 1604 in FIG. 16, respectively, and can be implemented in the same manner.

At 1906, spectral analysis is performed on the received signals to generate a set of bins in a range domain. The spectral analysis in block 1906 may, for example, involve a range DFT as discussed above in connection with block 1404 of FIG. 14.

At 1908, a first bin from the set of bins generated in block 1906 is identified as corresponding to one or more targets. For example, as discussed above in connection with block 1406 of FIG. 14, a range bin can be identified as being a bin whose value is highest among all the bins or as a bin whose value exceeds a certain threshold.

At 1910, a signal array is generated as a digital representation of a portion of the received signals corresponding to the first bin. The signal array in 1910 can be generated in a similar manner to the generating of the signal array in block 1606 of FIG. 16, except that received signals which do not correspond to the first bin are not taken into consideration when forming the signal array. This simplifies the resulting signal array for subsequent processing (e.g., MUSIC based analysis).

At 1912, a covariance matrix is calculated using the signal array from block 1910. The calculating of the covariance matrix in block 1912 can be implemented in the same manner as discussed above in connection with block 1608 of FIG. 16.

At 1914, eigenvectors of the covariance matrix from block 1912 are determined along with eigenvalues corresponding to the eigenvectors. Block 1914 corresponds to block 1712 of FIG. 17 and can be implemented in the same manner.

At 1916, a subspace is formed using a subset of the eigenvectors from block 1914. Block 1916 corresponds to block 1814 of FIG. 18 and can be implemented in the same manner.

At 1918, a steering array comprising vectors representing responses of the plurality of antennas to signals received from different directions in the field of view is generated. Block 1918 corresponds to block 1816 of FIG. 18 and can be implemented in the same manner.

At 1920, a set of projections is generated by projecting vectors from the steering array onto the subspace formed in block 1916. The generating of the set of projections in block 1920 can be performed in a similar manner to block 1818 of FIG. 18, except that instead of projecting a subset of vectors, all the vectors in the steering array can be projected.

At 1922, a pseudo spectrum is generated based on the set of projections from block 1920. Block 1922 corresponds to block 1820 of FIG. 18 and can be implemented in the same manner.

At 1924, a direction of arrival of a target is determined based on the pseudo spectrum from block 1922. For example, as discussed above in connection with block 1418 of FIG. 14, the direction of arrival could be an angle corresponding to a location of a peak in the pseudo spectrum.

Blocks 1908 to 1924 can be repeated to determine a direction of arrival of one or more additional targets. For instance, a second range bin of the set of bins generated in block 1906 could be identified, based on the processing in block 1908, as corresponding to one or more targets. In this manner, the directions of targets at different ranges can be determined from the results of a spectral analysis performed on the same set of received signals (e.g., the spectral analysis in block 1906).

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

What is claimed is:

1. An apparatus comprising:
a signal generator configured to generate a radar signal;
at least one transmit antenna configured to transmit the radar signal;
a plurality of antennas configured to receive a reflected radar signal, wherein each antenna of the plurality of antennas is configured to generate a respective received signal in response to the reflected radar signal; and
one or more processors configured to:
  generate a signal array as a digital representation of the received signals;
  calculate a covariance matrix using the signal array;
  determine a set of eigenvectors of the covariance matrix, wherein the set of eigenvectors is a subset of all eigenvectors of the covariance matrix, each eigenvector of the set of eigenvectors corresponding to a different target among a set of targets, and wherein to determine the set of eigenvectors, the one or more processors are configured to identify each eigenvector of the set of eigenvectors one at a time, through an iterative process in which a corresponding candidate eigenvector initialized with random values is refined until the candidate eigenvector converges to a final eigenvector representing a principal component; and
  determine one or more attributes of at least one target among the set of targets based on the set of eigenvectors.

2. The apparatus of claim 1, wherein to identify each eigenvector, the one or more processors are configured to:
generate a candidate eigenvector that, if included in the set of eigenvectors, forms an orthonormal basis; and
iteratively refine the candidate eigenvector by:
  generating a next candidate eigenvector;
  calculating a similarity metric whose value indicates a degree of similarity between the candidate eigenvector and the next candidate eigenvector;
  determining that the candidate eigenvector and the next candidate eigenvector are dissimilar based on comparing the value of the similarity metric to a threshold; and
  replacing the candidate eigenvector with the next candidate eigenvector based on determining that the candidate eigenvector and the next candidate eigenvector are dissimilar.

3. The apparatus of claim 1, wherein to identify each eigenvector, the one or more processors are configured to:
generate a candidate eigenvector that, if included in the set of eigenvectors, forms an orthonormal basis; and
iteratively refine the candidate eigenvector by:
  generating a next candidate eigenvector;
  calculating a similarity metric whose value indicates a degree of similarity between the candidate eigenvector and the next candidate eigenvector;
  determining that the candidate eigenvector and the next candidate eigenvector are similar based on comparing the value of the similarity metric to a threshold; and
  identifying the next candidate eigenvector as being an eigenvector of the set of eigenvectors based on determining that the candidate eigenvector and the next candidate eigenvector are similar.

4. The apparatus of claim 1, wherein to determine the one or more attributes of the at least one target, the one or more processors are configured to:
 form a signal subspace using the set of eigenvectors;
 project tones of different frequencies onto the signal subspace; and
 generate a pseudo spectrum based on the projected tones.

5. The apparatus of claim 4, wherein the one or more processors are configured to determine the one or more attributes based on the pseudo spectrum.

6. The apparatus of claim 1, wherein the one or more attributes comprise at least one of a distance of the at least one target and a direction of arrival of the at least one target.

7. A method comprising:
 transmitting a radar signal;
 receiving, by a plurality of antennas, a reflected radar signal, wherein each antenna of the plurality of antennas is configured to generate a respective received signal in response to the reflected radar signal;
 generating a signal array as a digital representation of the received signals;
 calculating a covariance matrix using the signal array;
 determining a set of eigenvectors of the covariance matrix, wherein the set of eigenvectors is a subset of all eigenvectors of the covariance matrix, each eigenvector of the set of eigenvectors corresponding to a different target among a set of targets, and wherein the determining of the set of eigenvectors comprises identifying each eigenvector of the set of eigenvectors one at a time, through an iterative process in which a corresponding candidate eigenvector initialized with random values is refined until the candidate eigenvector converges to a final eigenvector representing a principal component; and
 determining one or more attributes of at least one target among the set of targets based on the set of eigenvectors.

8. The method of claim 7, wherein the identifying of each eigenvector comprises:
 generating a candidate eigenvector that, if included in the set of eigenvectors, forms an orthonormal basis; and
 iteratively refining the candidate eigenvector by:
  generating a next candidate eigenvector;
  calculating a similarity metric whose value indicates a degree of similarity between the candidate eigenvector and the next candidate eigenvector;
  determining that the candidate eigenvector and the next candidate eigenvector are dissimilar based on comparing the value of the similarity metric to a threshold; and
  replacing the candidate eigenvector with the next candidate eigenvector based on determining that the candidate eigenvector and the next candidate eigenvector are dissimilar.

9. The method of claim 7, wherein the identifying of each eigenvector comprises:
 generating a candidate eigenvector that, if included in the set of eigenvectors, forms an orthonormal basis; and
 iteratively refining the candidate eigenvector by:
  generating a next candidate eigenvector;
  calculating a similarity metric whose value indicates a degree of similarity between the candidate eigenvector and the next candidate eigenvector;
  determining that the candidate eigenvector and the next candidate eigenvector are similar based on comparing the value of the similarity metric to a threshold; and
  identifying the next candidate eigenvector as being an eigenvector of the set of eigenvectors based on determining that the candidate eigenvector and the next candidate eigenvector are similar.

10. The method of claim 7, wherein determining the one or more attributes of the at least one target comprises:
 forming a signal subspace using the set of eigenvectors;
 projecting tones of different frequencies onto the signal subspace; and
 generating a pseudo spectrum based on the projected tones.

11. The method of claim 10, wherein the one or more attributes are determined based on the pseudo spectrum.

12. The method of claim 7, wherein the one or more attributes comprise at least one of a distance of the at least one target and a direction of arrival of the at least one target.

* * * * *